(12) United States Patent
Kessler et al.

(10) Patent No.: US 10,034,128 B2
(45) Date of Patent: Jul. 24, 2018

(54) SYSTEMS AND METHODS FOR CONNECTING AND COMMUNICATING WITH OTHERS IN A MOBILE DEVICE ENVIRONMENT

(71) Applicant: ARC10 Technologies Inc., Boston, MA (US)

(72) Inventors: Marc Kessler, Newton, MA (US); Jonathan Schwartz, Newton, MA (US); Greg Hassett, Cambridge, MA (US); Rob Frasca, Watertown, MA (US)

(73) Assignee: Arc10 Technologies Inc., Boston, MA (US)

( * ) Notice: Subject to any disclaimer, the term of this patent is extended or adjusted under 35 U.S.C. 154(b) by 57 days.

(21) Appl. No.: 14/832,844

(22) Filed: Aug. 21, 2015

(65) Prior Publication Data

US 2016/0057576 A1 Feb. 25, 2016

Related U.S. Application Data

(60) Provisional application No. 62/070,349, filed on Aug. 21, 2014.

(51) Int. Cl.
*H04W 12/04* (2009.01)
*H04W 4/021* (2018.01)
*H04W 12/08* (2009.01)
*H04L 29/06* (2006.01)
*H04L 9/08* (2006.01)

(52) U.S. Cl.
CPC ........... *H04W 4/021* (2013.01); *H04W 12/08* (2013.01); *H04L 9/0891* (2013.01); *H04L 63/107* (2013.01); *H04W 12/04* (2013.01)

(58) Field of Classification Search
CPC ........ G06Q 50/01; H04W 8/005; H04W 4/08; H04W 4/206
See application file for complete search history.

(56) References Cited

U.S. PATENT DOCUMENTS 7,167,731 B2 1/2007 Nelson
8,352,546 B1 1/2013 Dollard
(Continued)

OTHER PUBLICATIONS

International Preliminary Report on Patentability issued by the International Bureau dated Mar. 2, 2017 in related International Application No. PCT/US2015/046376.
(Continued)

*Primary Examiner* — Dung Hong
(74) *Attorney, Agent, or Firm* — Gesmer Updegrove LLP

(57) ABSTRACT

A mobile device system is disclosed for defining a plurality of pre-defined geographical locations. The system provides that each of the plurality of pre-defined geographical locations is associated with a number of users of the mobile device system that are within one or more pre-defined geographical locations, and provides that each of the number of users may request that a particular one or more of the pre-defined geographical locations be activated, and provides that an activated pre-defined geographical location becomes activated when a minimum number of users send a ping signal from within the one or more pre-defined geographical locations.

28 Claims, 23 Drawing Sheets

(56) References Cited

U.S. PATENT DOCUMENTS

| | | | |
|---|---|---|---|
| 8,549,597 B1* | 10/2013 | Strand | H04L 63/08 |
| | | | 705/1.1 |
| 8,630,494 B1* | 1/2014 | Svendsen | G06K 9/00677 |
| | | | 382/209 |
| 8,798,646 B1 | 8/2014 | Wang et al. | |
| 9,152,477 B1 | 10/2015 | Campbell et al. | |
| 9,628,950 B1* | 4/2017 | Noeth | H04M 1/72552 |
| 2003/0020623 A1 | 1/2003 | Cao et al. | |
| 2005/0181803 A1* | 8/2005 | Weaver | H04W 4/02 |
| | | | 455/456.1 |
| 2007/0198495 A1 | 8/2007 | Buron et al. | |
| 2011/0102556 A1* | 5/2011 | Kim | H04N 1/00307 |
| | | | 348/51 |
| 2011/0320969 A1* | 12/2011 | Hwang | G06F 1/1626 |
| | | | 715/765 |
| 2012/0054005 A1* | 3/2012 | Manning | G06F 21/30 |
| | | | 705/14.4 |
| 2012/0258735 A1* | 10/2012 | Monteverde | H04W 4/021 |
| | | | 455/456.3 |
| 2013/0124508 A1* | 5/2013 | Paris | G06F 17/3028 |
| | | | 707/723 |
| 2013/0232012 A1* | 9/2013 | Yan | G06Q 30/02 |
| | | | 705/14.67 |
| 2013/0286223 A1* | 10/2013 | Latta | H04N 1/00347 |
| | | | 348/207.1 |
| 2014/0019867 A1* | 1/2014 | Lehtiniemi | G06Q 50/01 |
| | | | 715/738 |
| 2014/0059139 A1* | 2/2014 | Filev | G06Q 50/01 |
| | | | 709/205 |
| 2014/0114565 A1 | 4/2014 | Aziz et al. | |
| 2014/0125823 A1* | 5/2014 | Johnson | H04N 1/00137 |
| | | | 348/207.11 |
| 2014/0135052 A1* | 5/2014 | Apfel | G06F 3/0486 |
| | | | 455/519 |
| 2014/0222908 A1* | 8/2014 | Park | H04W 4/21 |
| | | | 709/204 |
| 2014/0359482 A1* | 12/2014 | Sinn | H04W 4/21 |
| | | | 715/753 |
| 2015/0304437 A1* | 10/2015 | Vaccari | G06F 1/3215 |
| | | | 709/204 |

OTHER PUBLICATIONS

International Search Report & Written Opinion dated Jan. 7, 2016 in connection with related international application No. PCT/US15/46376, 13 pages.

Extended European Search Report issued by European Patent Office in European Patent Application No. 15834180 dated Feb. 15, 2018.

Bujari, et al., "Nudge Nudge: A Proximity Based Social Application", Wireless Days (WD), 2011, IEEE, Oct. 10, 2011, pp. 1-3.

* cited by examiner

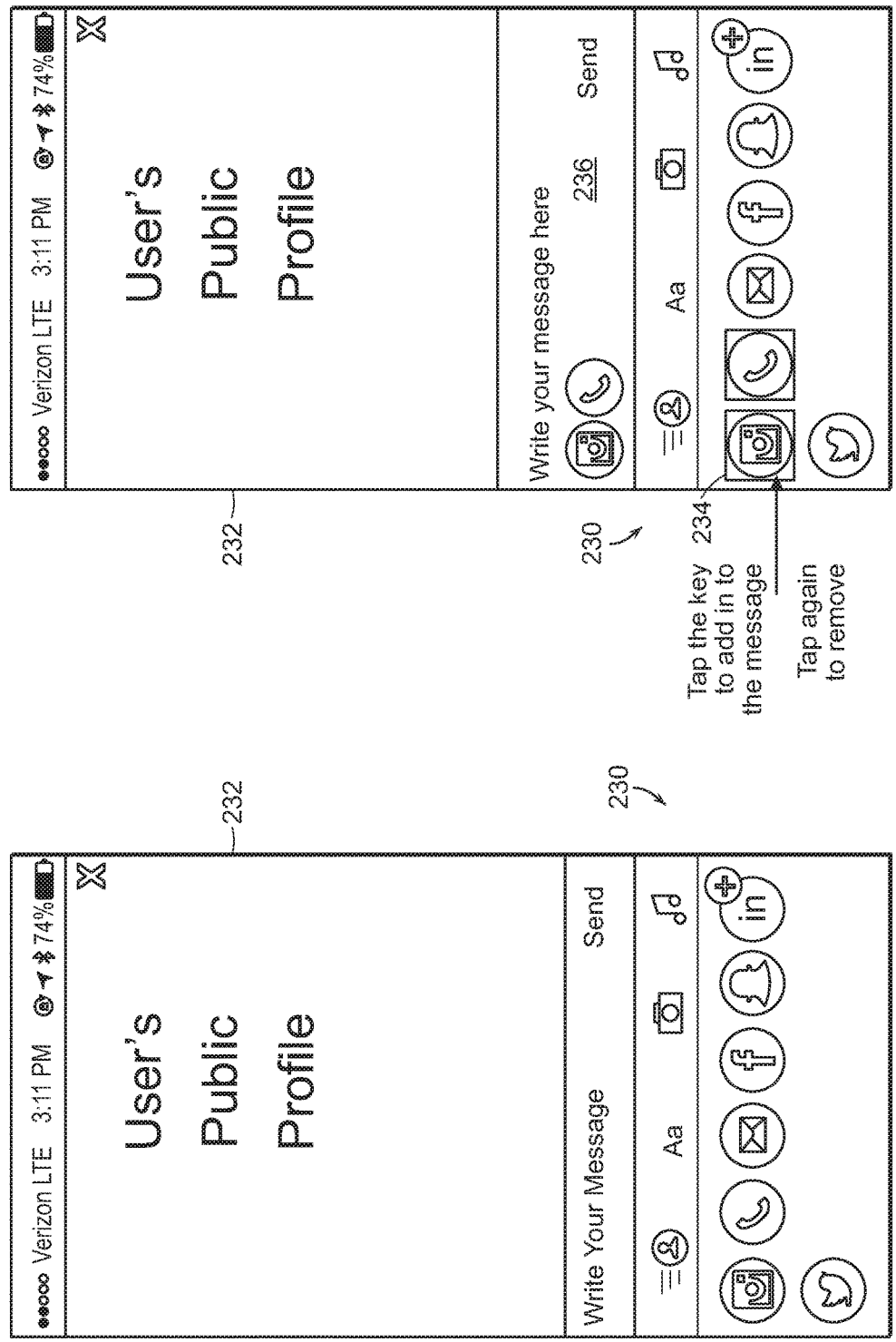

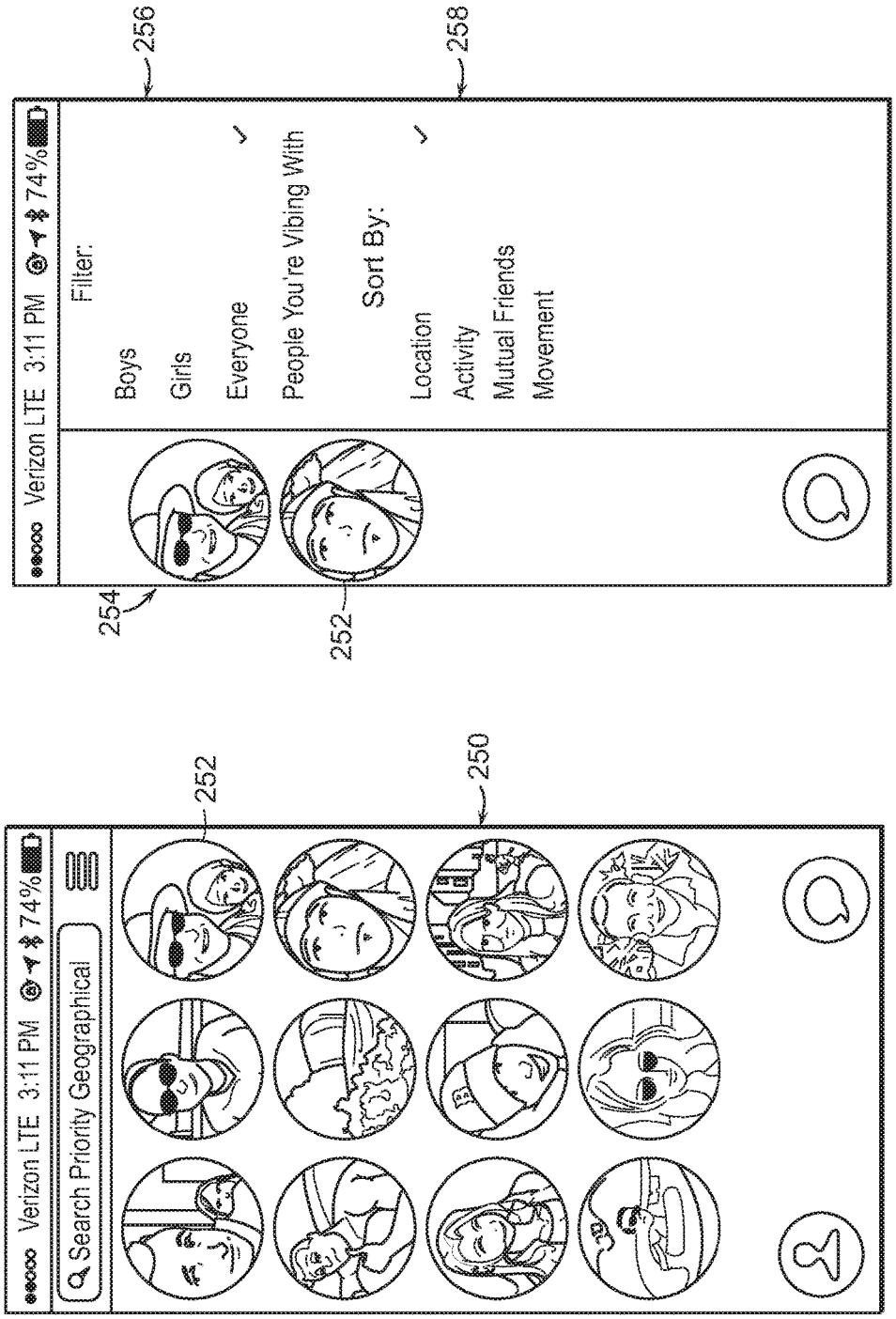

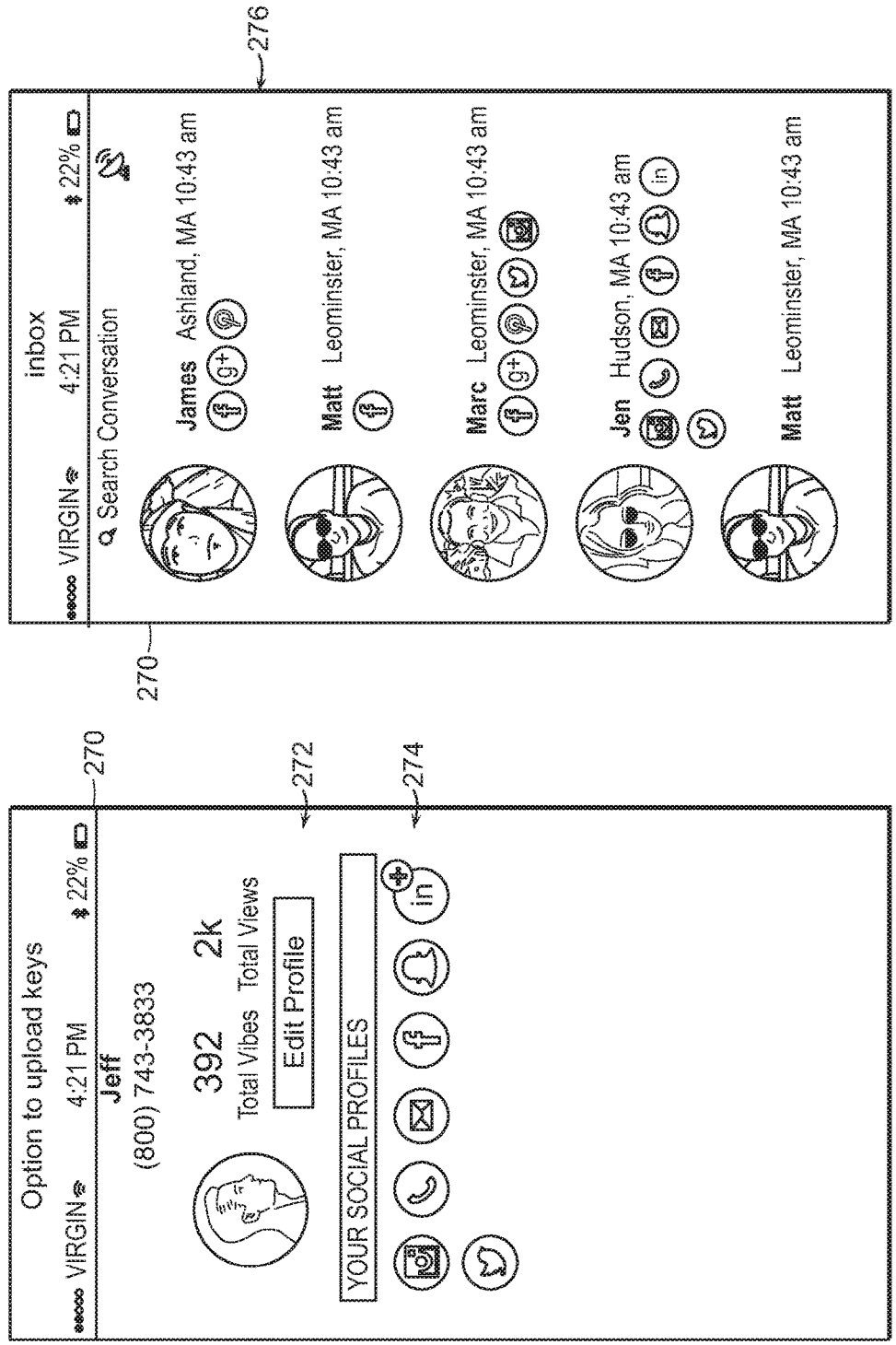

SYSTEMS AND METHODS FOR CONNECTING AND COMMUNICATING WITH OTHERS IN A MOBILE DEVICE ENVIRONMENT

PRIORITY

The present application claims priority to U.S. Provisional Patent Application Ser. No. 62/070,349 filed Aug. 21, 2014, the disclosure of which is hereby incorporated by reference in its entirety.

BACKGROUND

Beginning in the early 2000s, numerous digital services have adopted systems in which each user creates a unique digital identity that allows the user to interact with other users on a platform. These services include, but are not limited to, social networking, messaging, music, gaming, forums, etc. As a result, it is becoming increasingly difficult and inefficient to manage, share, and connect over multiple disconnected mediums. This is especially true in instances when a person desires to connect with others across several platforms at once. A person who wishes to share his or her own digital contact information is burdened by the process of manually referencing or typing the information to everyone he or she wishes to share it with, separately. As used herein the term "digital contact information" includes but is not limited to, information that identifies a user within any service with unique usernames (e.g., music services, forums etc.), any service with unique social media profiles (e.g., social medias, friending/following/adding/connecting), or any system with unique identification strings (e.g., phone numbers, email addresses, credit cards etc.). As used herein, the term "Key" means a representative icon that has digital contact information stored within linked to it. Each "Key" uniquely identifies a user within a particular domain, e.g., Facebook, or the telephone system.

Current systems require a specific address—someone's phone number, an email address, a username—to send information to, and an organized way to receive and manage said information. The requirement for knowing and entering such personal contact information creates barriers to connecting with people who may share a similar experience or location but otherwise do not have each other's contact information.

There remains a need therefore, for an improved system and method for allowing people to contact, to connect and to communicate with each other in further expressive ways that are easy to use.

SUMMARY

In accordance with an embodiment, the invention provides a mobile device system for defining a plurality of pre-defined geographical locations. The system provides that each of the plurality of pre-defined geographical locations is associated with a number of users of the mobile device system that are within one or more pre-defined geographical locations. The system also provides that each of the number of users may request that a particular one or more of the pre-defined geographical locations be activated, and further provides that an activated pre-defined geographical location becomes activated when a minimum number of users send a ping signal from within the one or more pre-defined geographical locations.

In accordance with another embodiment, the invention provides a method for providing, in a mobile device environment, a plurality of activated pre-defined geographical locations. The method includes the steps of associating each of a plurality of users of mobile devices that are within one or more pre-defined geographical locations, and permitting a set of the pre-defined geographical locations to become activated pre-defined geographical locations when a minimum number of users check-in within the one or more pre-defined geographical locations.

In accordance with a further embodiment, the invention provides a mobile device system for presenting to a user of the mobile device system, a plurality of images associated with a plurality of other users of the mobile device system that are within, or are in close proximity to, a pre-defined geographical location in common with the current location of the user.

In accordance with a further embodiment, the invention provides a method for permitting a user of a mobile device system to connect with another user of the mobile device system. The method includes the steps of activating a pre-defined geographical location when a minimum number of other users of the mobile device system (including the user and the other user) are within the pre-defined geographical location, presenting to the user on a mobile device, a plurality of images associated with the other users of the mobile device system within the pre-defined geographical location, and permitting the user to select from the plurality of images, an image associated with the other user.

In accordance with a further embodiment, the invention provides a method of providing, in a mobile device environment, personal contact information from a user of a mobile device system to another user of the mobile device system. The method includes the steps of registering an image associated with the user, defining a Key that includes a link to unique personal contact information of the user, and sending the Key to the other user, wherein the Key has a familiar appearance that displays information regarding a type of service, but does not disclose any of the link information regarding the user's unique personal contact information.

In accordance with a further embodiment, the invention provides a method of providing to a user of a mobile device system, a set of Keys associated with a plurality of persons. The method includes the steps of receiving one or more Keys from another user of the mobile device system, each Key including a link to a piece of digital contact associated with the other user, storing the one or more Keys on a mobile device of the user, and making one or more Keys available to the user of the mobile device.

In accordance with a further embodiment, the invention provides a method of providing to a user of a mobile device system, a set of Keys associated with a plurality of persons. The method includes the steps of receiving one or more Keys from another user of the mobile device system, each Key including a link to a personal social media pages associated with the other user, storing the one or more Keys on a mobile device of the user, and making one or more Keys available to the user of the mobile device.

In accordance with a further embodiment, the invention provides a method of providing, in a mobile device environment, a three-dimensional moving image. The method includes the steps of permitting the user of a mobile device in the mobile device environment to adjust at least two parameters of the three-dimensional moving image, said moving image being defined by three-dimensional spatial data, as well as rotational direction and velocity data, and sending information regarding the three-dimensional moving image to another person's mobile device in the mobile device environment such that an identical three-dimensional moving image may be created on the other person's mobile device to communicate an emotional expression.

BRIEF DESCRIPTION OF THE DRAWINGS

The following description may be further understood with reference to the accompanying drawings in which:

FIGS. 4A-1-4C-2 show illustrative diagrammatic flow charts showing the methods and operation of a system in accordance with an embodiment of the present invention;

FIGS. 8A and 8B show illustrative diagrammatic views of a mobile device for use in accordance with an embodiment of the present invention in which a Key keyboard is provided;

FIGS. 10A and 10B show illustrative diagrammatic views of an Open World Interface view on a mobile device in accordance with an embodiment of the present invention, as well as filter and sort views on the mobile device respectively;

FIG. 12 shows an illustrative diagrammatic view of a mobile device in accordance with an embodiment of the present invention in which a private profile is shown with an option to edit the public profile;

FIG. 13 shows an illustrative diagrammatic view of a mobile device in accordance with an embodiment of the present invention in which a message inbox is shown;

Figure 1:
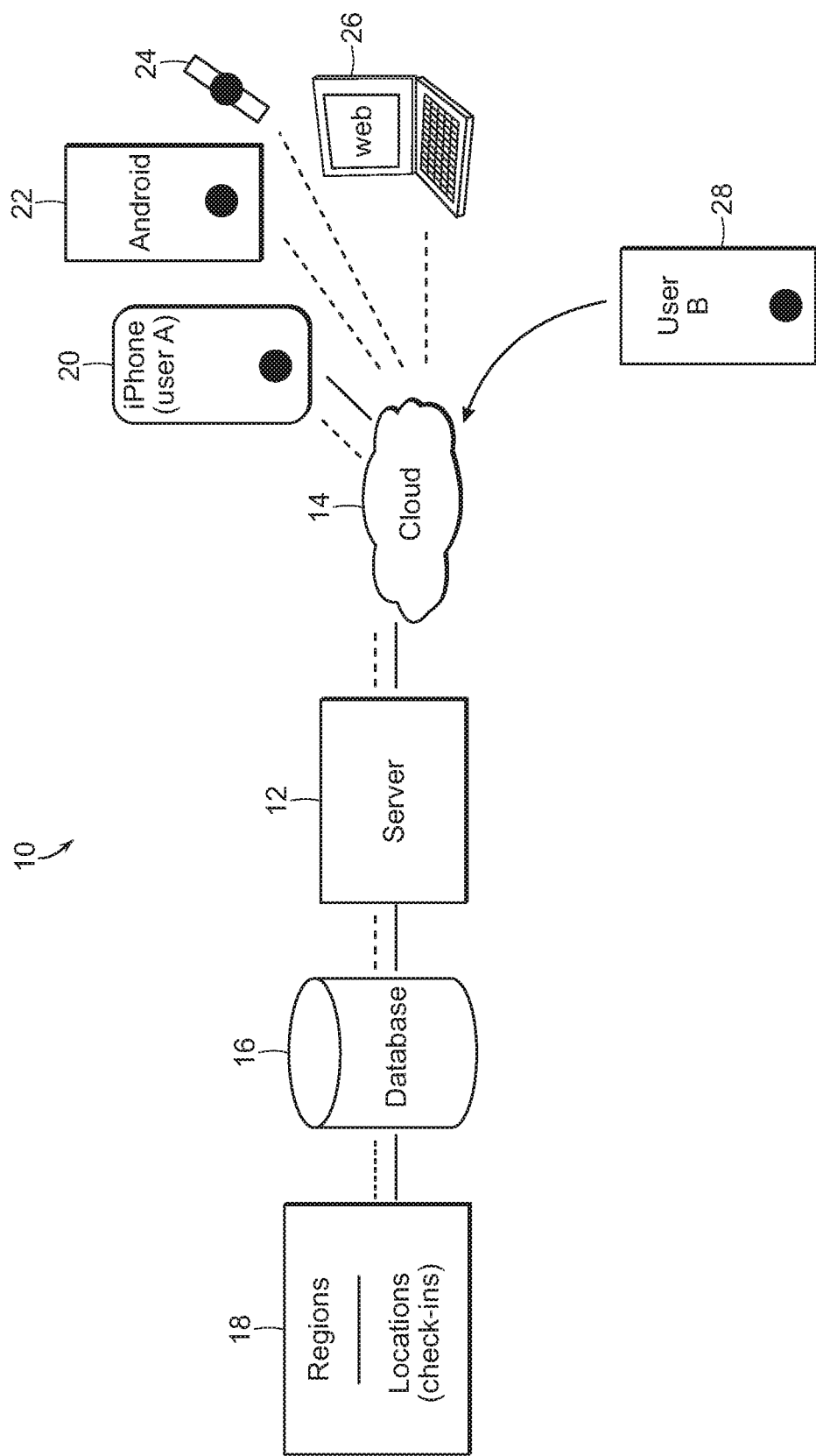
FIG. 1 shows an illustrative diagrammatic view of a system in accordance with an embodiment of the invention for gathering and displaying information to create the Open World Interface.

The drawings are shown for illustrative purposes only.

DETAILED DESCRIPTION

In accordance with certain embodiments, the invention involves the use of a mobile device environment to facilitate users of a mobile device system to contact, connect and communicate with each other where the users share a common experience, namely being in a common pre-defined geographical location, such as a building, a school campus, a town, a city, a state or a country.

Further, the invention provides a system that improves the usefulness of digital contact information and digital profiles, and allows people to locally share their contact information through pre-populated, representative icons. In accordance with an embodiment, the invention provides a mobile computer-implemented method for sharing complex digital contact information with the recipients defined only by a geographic region and/or proximity, and not requiring any previous communication or information.

The technology described below relates to the creation of a mobile-focused system in which users can store their several types of digital contact information through Keys. Users may then select any number of these Keys to transmit the corresponding digital contact information to a particular recipient (identified by an image) who shares a common geographical location in real time. There is no requirement for a previous exchange of information between the user and the recipient. A user may access and manage an aggregation of contact information (including Keys) that has been previously sent to aforementioned recipients. Similarly, a recipient may access and manage an aggregation of contact information (including Keys) that has been previously received from other users.

As used herein, the term "Geofence" means a pre-defined geometric region bounded by several coordinates (latitude longitude points). The term "check in" means a user pinging from a current location of a mobile device, one or more pre-defined geographic locations by using the mobile device system. The pre-defined geometric locations have associated "Activation Counters" which count the number of users who have checked-in within associated geographic locations. A region with an Activation Count of zero becomes active, and therefore usable. A region with an Activation Count of any number more than zero is inactive, and therefore unusable. The term "Avatar" means a picture of someone that can be used to identify them such as a license or passport photo, a Facebook profile picture, or a personal photo. The term "Open World Interface" means an aggregate visual matrix of the avatars. The term "Key Locker" means a system for storing and managing the Keys. The term "Sender Key locker" means a memory that stores the information of a user's own keys, these keys can be registered or unregistered. The term "Recipient Key Locker" means a memory that stores the information of another user's Keys, and these Keys can be active, inactive, expired, or revoked. The term "Public Profile" means information that's shared with anyone around a user. The term "Private Profile" means a collection of information that is sharable on a user's own terms and is not viewable to anyone who does not have access to the shared information. The term "Supervibe Keyboard" means a dynamic keyboard that is used to send messages with keys and multiple media types available to be used to add inline content to the message.

With reference to FIG. 1, in accordance with an embodiment, a system 10 of the invention includes a server 12 that is connected through the Internet 14 to devices. The server 12 is coupled to a database 16 that, in part, stores check-ins, locations and geofences 18 as defined above. The user devices, which may include an iPhone 20, an Android phone 22, an Internet connected watch 24, a laptop or iPad 26, and/or a further mobile device 28. The devices communicate with the cloud-based server. Each user device sends information, as detailed below, to the cloud-based server 12. The server 12 receives the information from each device, stores the information in the database 16, applies the server's algorithms to the dataset, effectively organizes the data, and sends the organized dataset back to each user's device. Each user device then displays the respective dataset on the mobile device of each user.

The invention provides, in accordance with certain embodiments therefore, a mobile computer-implemented method for locally sharing prepopulated digital contact information, not requiring any previous interaction or information, including (1) the hyper local activation of the service, (2) the creation and organization of the Open World Interface, (3) a system for storing digital contact information in representative icons, (4) a system for sending, receiving, and interacting with digital contact information, and (5) a method for parameterizing and sharing three dimensional dynamic emoticons.

Figure 2:
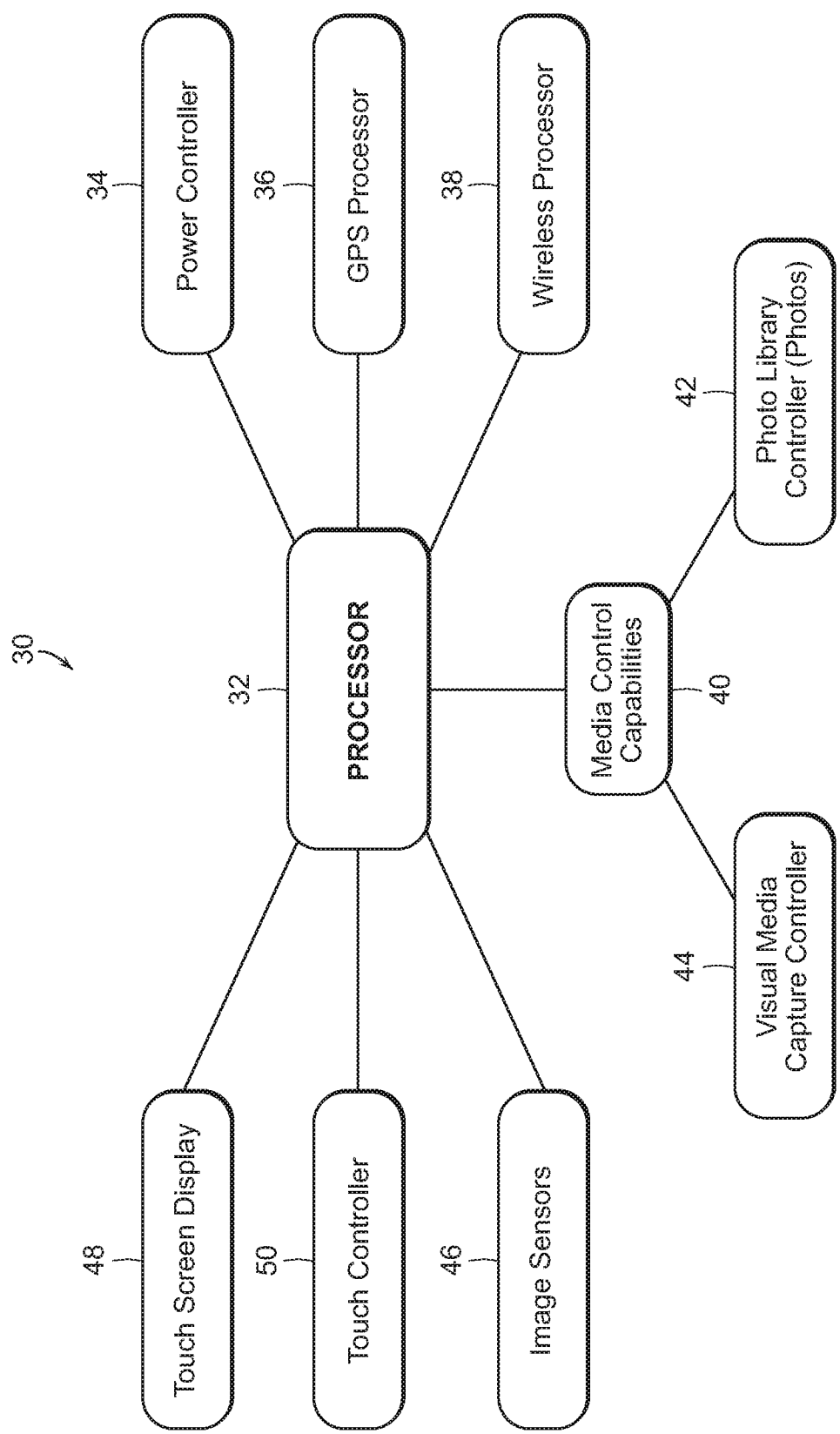
FIG. 2 shows an illustrative diagrammatic view of processor functionalities in a mobile device for use in a system in accordance with an embodiment of the present invention.

With reference to FIG. 2, the mobile device system 30 includes, in accordance with an embodiment, a central processor 32 including a memory and any geo-local information transfer system (GPS/Bluetooth/Wi-Fi/OUR HARDWARE), a dynamic keyboard, a view controller, and data services. In particular, the processor may provide power control 34, a GPS processor (or any geo-local info transfer system like Bluetooth, wifi . . . etc) 36, a wireless processor 38, media control capabilities 40 (including a photo library controller for photos 42, and a visual media capture controller) 44, image sensors 46, a touch screen display 48, a touch controller 50 and a view controller.

Figure 3:
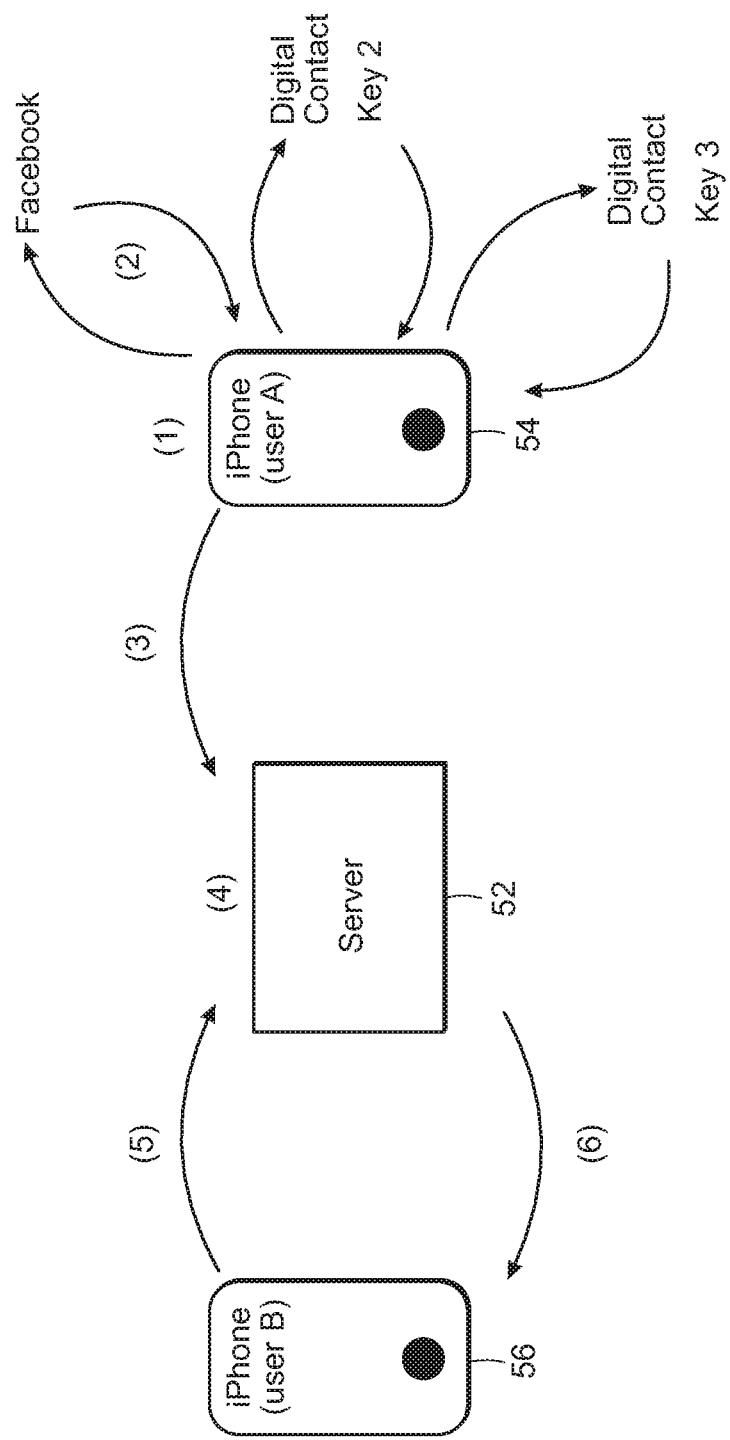
FIG. 3 shows an illustrative diagrammatic view of a system in accordance with an embodiment of the present invention for use in sending, receiving and viewing digital contact Keys.
Figure 7:
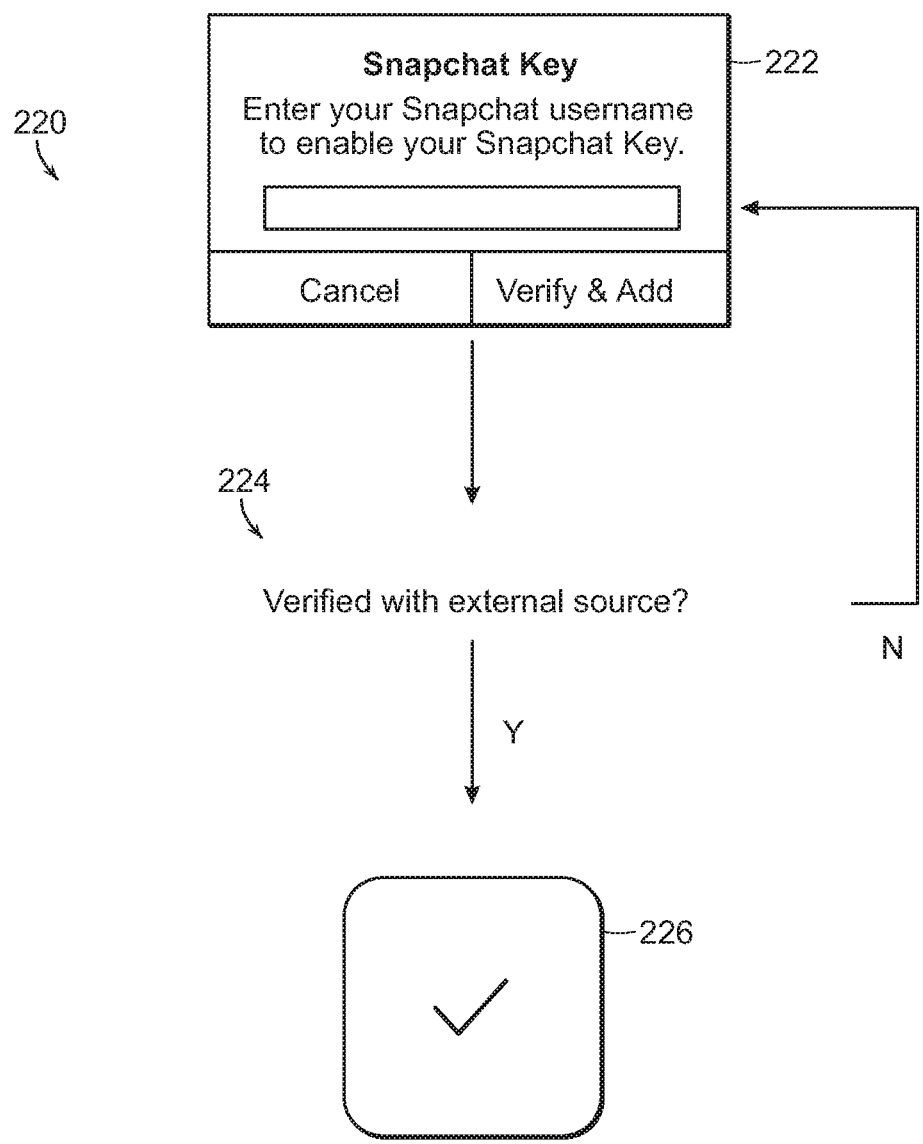
FIG. 7 shows an illustrative diagrammatic view of a process of entering a Key in a system in accordance with an embodiment of the present invention.

With reference to FIG. 3, the server 52 collects user's IDs from various devices 54, 56, The user's IDs contain public information (public profile, Avatar, first name etc.), location and location timestamps that give information concerning when the location information was acquired on the device and received by the server. As shown at 220 in FIG. 7 for example, each user may enter the digital contact information for their respective unique usernames, unique social media profiles, and/or unique identification strings (phone number, email, etc.) 222, which will then be verified by the external source 224 prior to being approved 226.

The server references the pre-defined geographical locations and applies an algorithm to the users' locations to associate them with such locations, and also collects geographical regions coordinates (geofences) in tandem and applies the algorithm to each user's location data clustering the users into regions. During this process, the server differentiates between regions in certain geofences that contain different priorities. The server will also not display the location information on the Open World Interface in a region that is not yet activated. Every time a user refreshed the Open World Interface, the server collects the above-mentioned data, and transmits it to the device, which displays it on the Open World Interface. The server does not collect private information (digital contact Keys and private registration information) upon refreshing the Open World Interface.

Each user device 54, 56 not only communicates to the server 52, but can also communicate with other social media servers such as Facebook, Snapchat, Instagram, LinkedIn etc. As shown at (1) in FIG. 3, a user may elect to store his or her social media identity (Keys) within the system. As shown at (2), the server authenticates with the external service (if required), and as shown at (3), the user's device transmits the authentication information received from an external source, e.g., an authentication token, to the server and gets an Opaque ID (a specific number associated with the social media identity, and such association is known only to the server). As shown at (4), the user chooses to send social media identity to another user B nearby, and the server makes the Opaque ID available to the recipient other user. As shown at (5), if the user B wants to visit the social media identity that was shared with him or her from user A, an Opaque ID is sent to the server. As shown at (6), the server then validates permissions and then upon a valid permission, returns a social media identity token to user B. The user B is then immediately taken to that social media site, page, app, etc., which contains user A's identity.

In particular, and with reference to FIGS. 4A-1-4C-2, the operation of the system is as follows. A user begins (step 400) by turning on a device in the mobile device environment. If there are more than one active pre-defined geographic locations in which the user is located, and if the Activation Counter for a location is not at zero (step 402) then the system begins activation (step 404) for that location. All current nearby locations are pinged (step 404), and their corresponding Activation Counters are decremented (step 406). If the decrement counter is at zero (step 410), then the system returns to step A (step 402), and if not the system goes to step B (step 416).

The service therefore, only becomes available to users whose coordinate location is in geofences that are activated. Geofences activate when a certain number of users ping at a location within the geofence boundaries. The server remembers the number of different users that have pinged at a location within the boundaries of any given geofence. Every new user that pings at a location within a geofence decreases the number of total pings required to activate the geofence until the Activation Counter reaches zero and the service becomes available. One single user cannot count as 2 pings within the same geofence. However, the same user does count as 1 ping for different overlapping geofences as discussed further below.

It is possible that geofences overlap or fit inside one another. For example, one smaller geofence may be inside another larger geofence. In this case, any user who pings at a location within a smaller geofence (that is also inside the larger one) is also pinging at a location that is within the larger geofence. Therefore, a user who pings a location inside two geofences at once will decrease the Activation Counter in both geofences. This system can be applied to any area and can comprise an infinite amount of geofences given that are appropriately prioritized.

There may be many priorities of geofences, for example, for buildings, schools, cities and states. For example, school geofences activate when "x" number of users ping at a location within the geofence boundary, and city geofences activate when "y" number of users ping at a location within the geofence boundary. Higher degrees of priority specification (which may, for example, follows a general trend of smaller area size) are achievable. For instance, a stadium could have its own geofence which would have a higher priority specification than a school campus. A restaurant could have its own geofence which would have a higher priority specification than a stadium.

Every user on the service has a predetermined personal radius of "x" km around the user's location. There is a 6 step process to determine who appears on a user's Open World Interface: (1) the server collects all active geofences that have a point or edge within "x" km of the user's location, (2) the server prioritizes and orders the geofences (the priorities are predetermined on a per geofence basis), (3) the server finds the active geofence with the highest priority, (4) the server collects a list of people from: a) all the people in the highest priority active geofence, b) all the people in active geofences that are equal in priority to the highest priority geofence (and also have a point or edge within "x" km of the user's location), and c) all the people within "x" km's of the user's location, (5) the list from step (4) is sorted from nearest to farthest to a user's current location, and (6) the Open World Interface displays the list of users collected in step (4) placing nearest users at the top of the interface. Any person who is not in the list collected in step (4) will not displayed on the aforementioned user's Open World Interface.

Figure 5A:
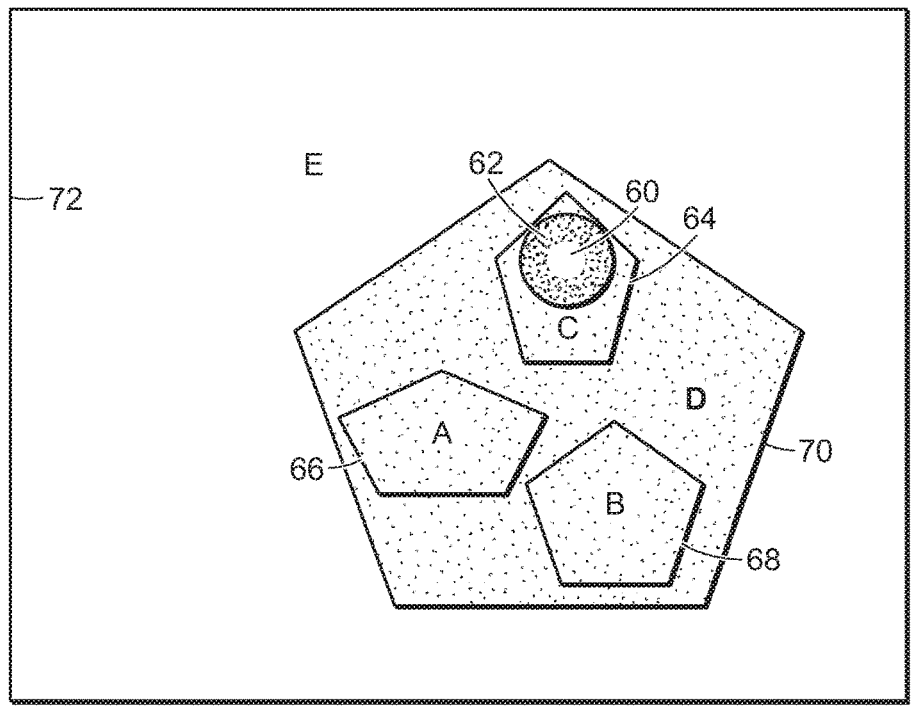
FIGS. 5A-5H show illustrative diagrammatic views of examples of implementations of pre-defined geographical locations in accordance with various embodiments of the present invention.

FIGS. 5A-5H show various examples of applications of the pre-defined geographical locations (geofences). For example, FIG. 5A shows a user 60 having a radius as shown at 62. The user is in located pre-defined geographical locations C (shown at 64), D (shown at 70) and E (shown at 72). In this example, none of the pre-defined geographical locations A (shown at 66), B (shown at 68), C (shown at 64), D (shown at 70) or E (shown 72) has yet been activated. A user would see a pre-activation screen only, and no users would be shown.

Figure 5B:
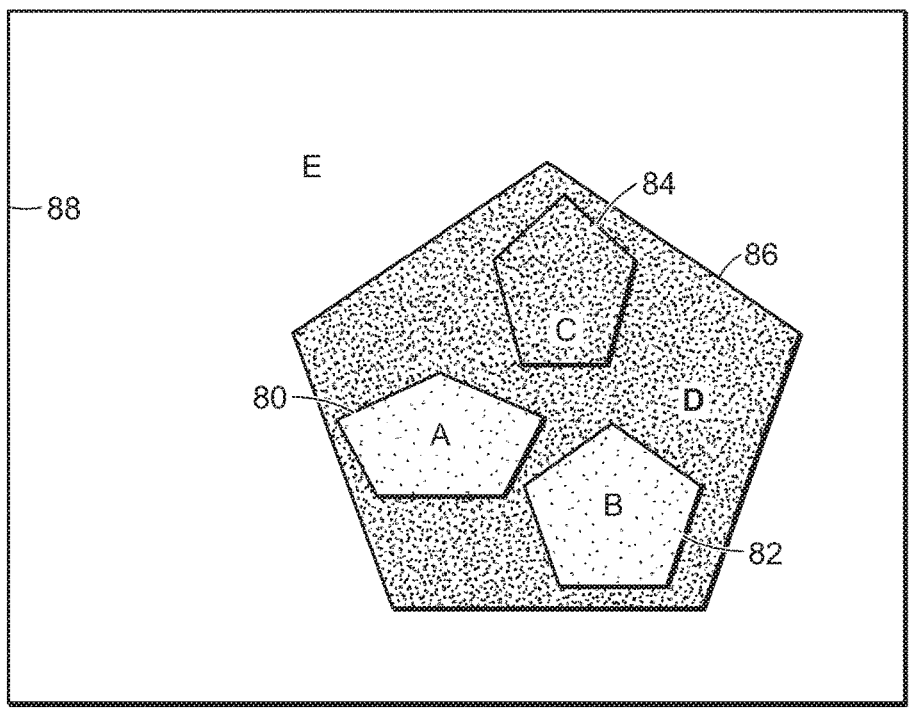

Some geofences may be active while others are inactive. FIG. 5B shows a plurality of pre-defined geographical locations: location A (shown at 80), location B (shown at 82), location C (shown at 84), location D (shown at 86) and location E (shown at 88). In this example, locations C & D are active, locations A, B and E are inactive. Locations A, B and C are high priority, and locations D and E are low priority.

Figure 5C:
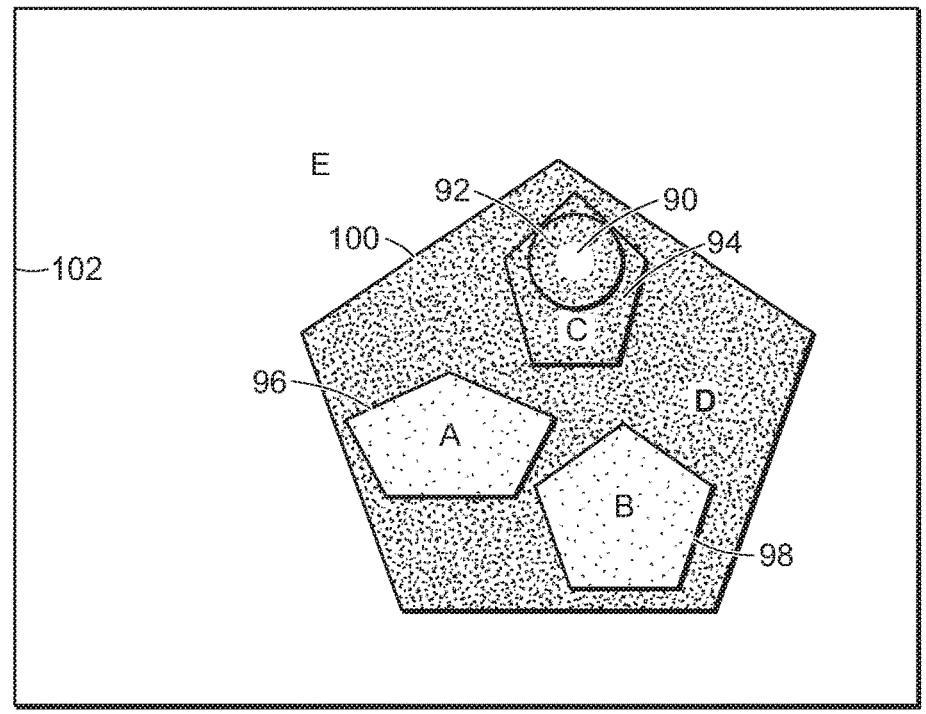

The example of FIG. 5C demonstrates which other users a user may see. FIG. 5C shows at 90 a user having a radius 92. The example also includes pre-defined geographical location A (shown at 96), pre-defined geographical location B (shown at 98), pre-defined geographical location D (shown at 100) and pre-defined geographical location E (shown at 102). The user 90 is located in pre-defined geographical location C (shown at 94) location D (shown at 94), which are each active, as well as location E (shown at 102), which is inactive. All locations except E are active. The system will find all geofences that share a coordinate within the radius (x km) of the user 90's location (the personal radius 92). This includes geofences C and D. The system them organizes the geofences from high to low priority. In this example, geofence C is a higher priority than geofence D. The system then selects the higher priority geofence C and lists all of the users from the highest priority geofence from the Open World Interface in conjunction with users that also fall within the user's own personal radius.

Figure 5D:
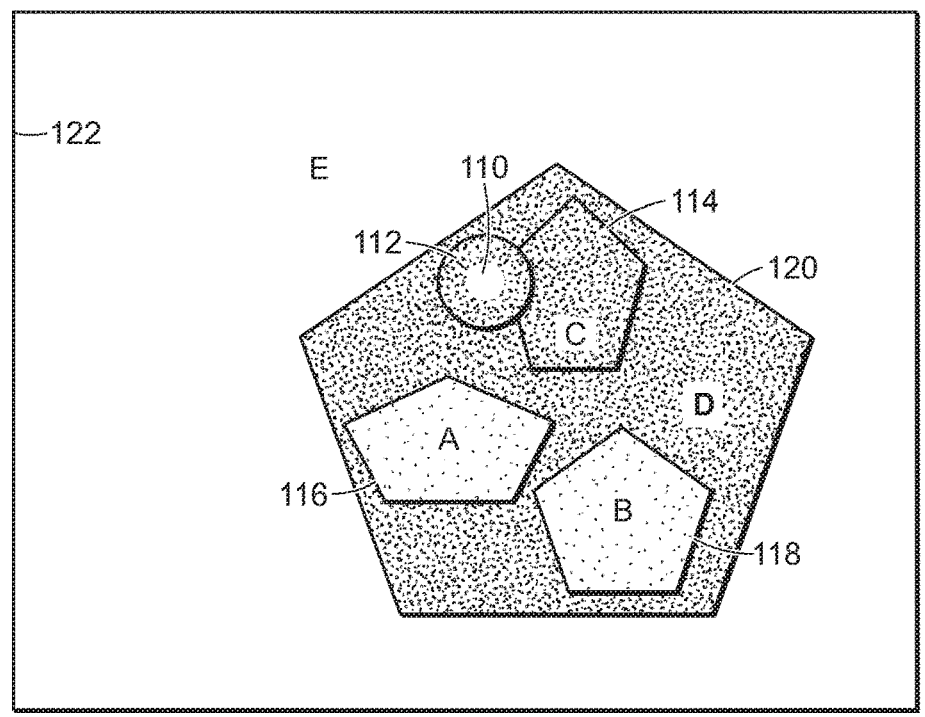

Similarly, the example of FIG. 5D demonstrates the importance of the user's radius. FIG. 5D shows at 110 a user having a radius 112. The example also includes pre-defined geographical location A (shown at 116), pre-defined geographical location B (shown at 118), pre-defined geographical location D (shown at 120) and pre-defined geographical location E (shown at 122). The user 110 is located near but not in pre-defined geographical location C (shown at 114), which is active. The user 110 is also located within location D, which is active, as well as location E, which is not active. The user's radius 112 is at least partly within the pre-defined geographical location C. All locations except location E are active. The system will find all geofences that share a coordinate within the radius (x km) of the user 110's location (the personal radius 112). This includes geofences C and D. The system them organizes the geofences from high to low priority. Again, in this example, geofence C is a higher priority than geofence D. The system then selects the higher priority geofence C and lists all of the users from the highest priority geofence from the Open World Interface in conjunction with users that also fall within the user's own personal radius.

Figure 5E:
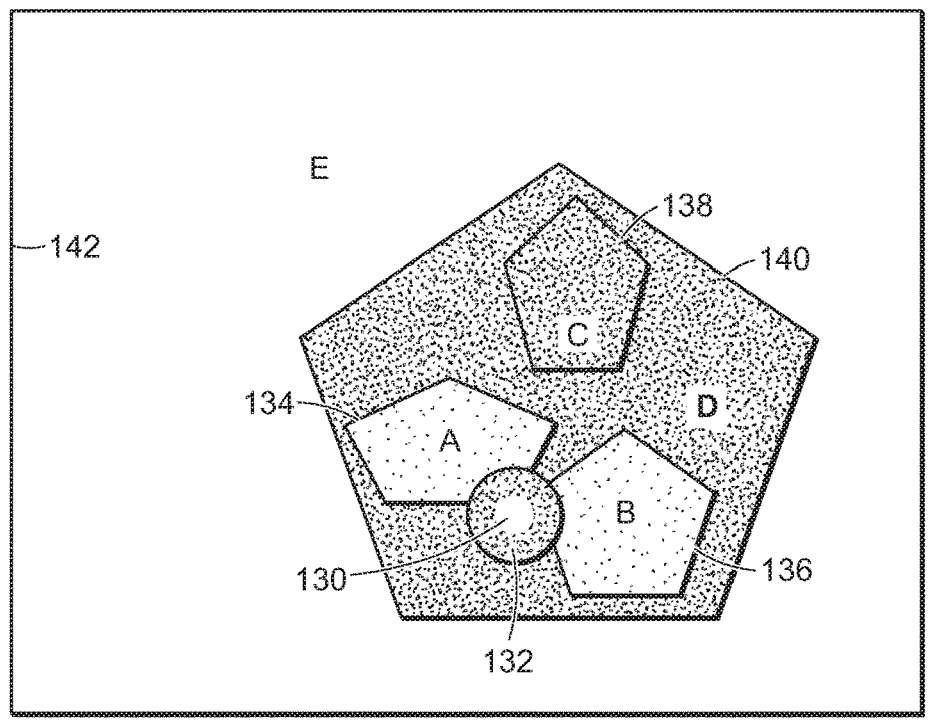

A shown in the example of FIG. 5E, a user's personal radius may overlap with more than one pre-defined geographical location. FIG. 5E shows at 130 a user having a radius 132. The user 130 is located near but not in pre-defined geographical location A (shown at 134) and pre-defined geographical location B (shown at 136). The user's radius 132 is at least partly within the pre-defined geographical location A and the pre-defined geographical location B. The user 130 is also located within location D (shown at 140), which is active, as well as location E (shown at 142), which is not active. The example also includes pre-defined geographical location C (shown at 138). In this example, locations A and D are active, but locations B, C and E are not active. The system will find all geofences that share a coordinate within the radius (x km) of the user 130's location (the personal radius 132). This includes locations A and D. The system them organizes the geofences from high to low priority. In this example, geofence A is a higher priority than geofence D. The system then selects the higher priority geofence A and lists all of the users from the highest priority geofence from the Open World Interface in conjunction with users that also fall within the user's own personal radius.

Figure 5F:
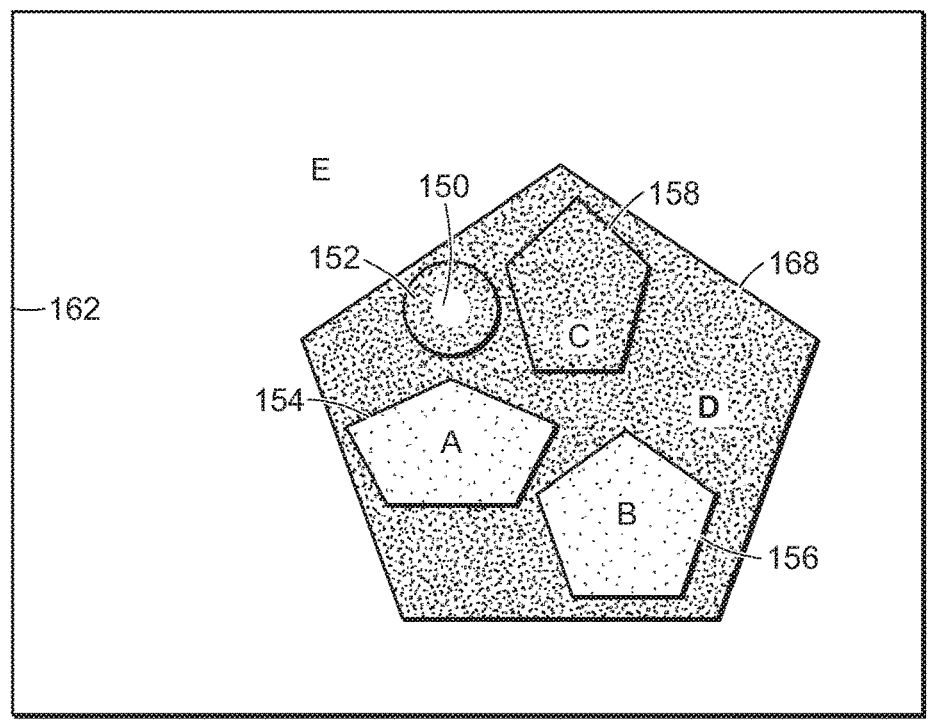

Geofence areas may be large, in which case sorting algorithms based on specific locations and movement patterns (as discussed further below) may become significant. FIG. 5F shows at 150 a user having a radius 152. The user 150 is located in pre-defined geographical location D (shown at 160) only. The user's radius 152 does not overlap any other geofences. The example also includes pre-defined geographical location A (shown at 154), pre-defined geographical location B (shown at 156), pre-defined geographical location C (shown at 158), pre-defined geographical location D (shown at 160) and pre-defined geographical location E (shown at 162). In this example, locations A, B and D are active, but locations C and E are not active. The system will find all geofences that share a coordinate within the radius (x km) of the user 150's location (the personal radius 152). This includes no other locations. The system them organizes the geofences from high to low priority. In this example, geofence D is a highest priority geofence. The system then selects the higher priority geofence D and lists all of the users from the highest priority geofence from the Open World Interface in conjunction with users that also fall within the user's own personal radius.

Figure 5G:
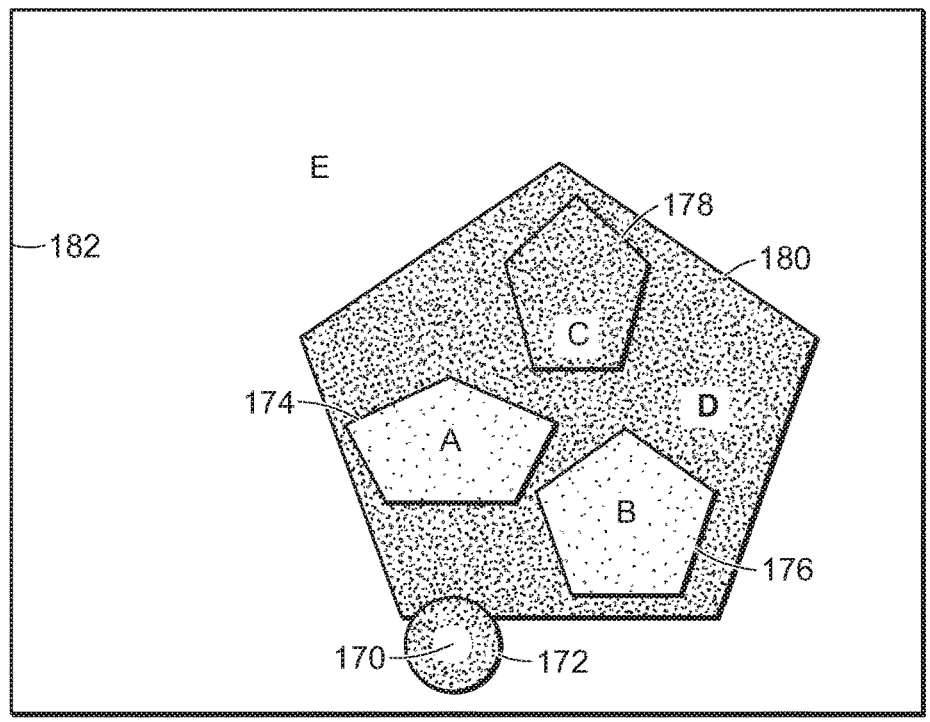

FIG. 5G shows at 170 a user having a radius 172. The user 170 is located near but not in pre-defined geographical location D (shown at 180) only. The user's radius 172 does not overlap any other geofences other than location D. The example also includes pre-defined geographical location A (shown at 174), pre-defined geographical location B (shown at 176), pre-defined geographical location C (shown at 178), pre-defined geographical location D (shown at 180) and pre-defined geographical location E (shown at 182). In this example, locations A, B and D are active, but locations C and E are not active. The system will find all geofences that share a coordinate within the radius (x km) of the user 170's location (the personal radius 172). This includes pre-defined geographical location D. The system them organizes the geofences from high to low priority. In this example, geofence D is a highest priority geofence. The system then selects the higher priority geofence D and lists all of the users from the highest priority geofence from the Open World Interface in conjunction with users that also fall within the user's own personal radius.

Figure 5H:
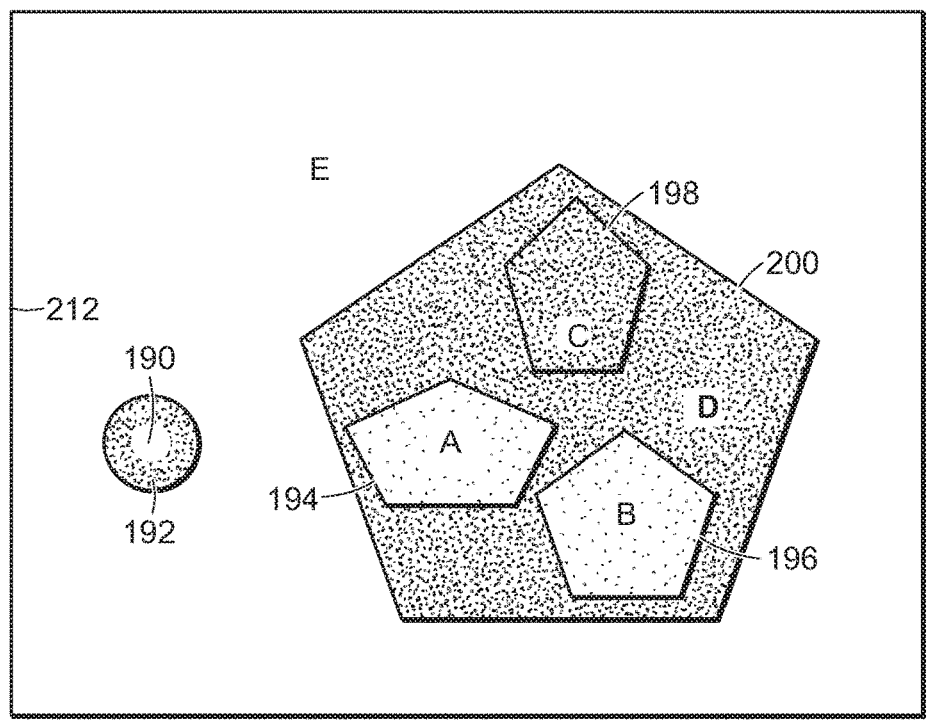

In the example of FIG. 5H, neither the user 190 nor the radius 192 is located near any of pre-defined geographical location A (shown at 194), pre-defined geographical location B (shown at 196), pre-defined geographical location C (shown at 198), or pre-defined geographical location D (shown at 200). The user is however located within pre-defined geographical location E (shown at 202). In this example, if location E is active, the it will become the highest priority geofence, and the system then selects the higher priority geofence E and lists all of the users from the highest priority geofence from the Open World Interface in conjunction with users that also fall within the user's own personal radius.

With reference again to FIGS. 4A-1 and 4A-2, if the user is in an active location, then the system selects all available active locations with the highest priority (step 416), and shows the images (step 418) of all users in these location. The system permits that the user may filter (step 420) the users, and if chosen, the system goes to FIG. 4B as discussed below. The system then shows updated images (step 422) as the Open World Interface.

The Open World Interface is therefore, an aggregate visual matrix of the avatars and respective first names of the people around a user. It is used to facilitate the local transfer/sharing/messaging of digital contact information by providing the minimal amount of information to identify an individual as the recipient of a message. The initial contact does not require users to be friends or follow each other on the service, only that both users are on the service and visible on the Open World Interface. After the initial contact, it is not necessary for users who are corresponding to be visible from the Open World Interface.

FIGS. 10A and 10B, for example, show at 250 an Open World Interface of available on a mobile device 252, and show at 254 a more limited view of users based on any filtering (as provided at 256) and/or sorting (as provided at 258).

The sorting and ordering of users on the Open World Interface can be, but is not limited to being, influenced by factors of shared velocities, mutual connections on other platforms, shared time in a micro area, previous conversations and interactions, shared travel and location patterns, etc.

Users may also choose to search for others on the Open World Interface by searching by first name. As the user types in letters of a name, the Open World Interface will only display users who fit the given search criteria. A user may manually refresh the Open World Interface by pulling the screen down. The Open World Interface is automatically refreshed based on a system of triggers which are listed below, but not limited to: velocity triggers—when a user starts moving at a certain velocity for a period of time through the accelerometer, Activity triggers—when a user has not manually refreshed after a certain period of time, Time triggers—the Open World Interface may refresh according to a predetermined schedule, Location triggers—if a user enters a new geofence, and Distance triggers—if a user has traveled "x" km's in the same geofence.

The users who appear on the Open World Interface can also be filtered by, but not limited to: occupation, fraternity/sorority, users who have previously interacted, users who have not previously interacted, gender, age, school, a number of mutual friends, and facial features. When a user elects to turn on a filter, any user who does not fall inside the given filter criteria will not be displayed on the Open World Interface. The users who do fit the given search criteria will remain on the Open World Interface sorted from nearest location at the top of the interface to the furthest at the bottom. The Open World Interface employs a number of other velocity and time based algorithms to sort the users.

Figures 1, 4A:
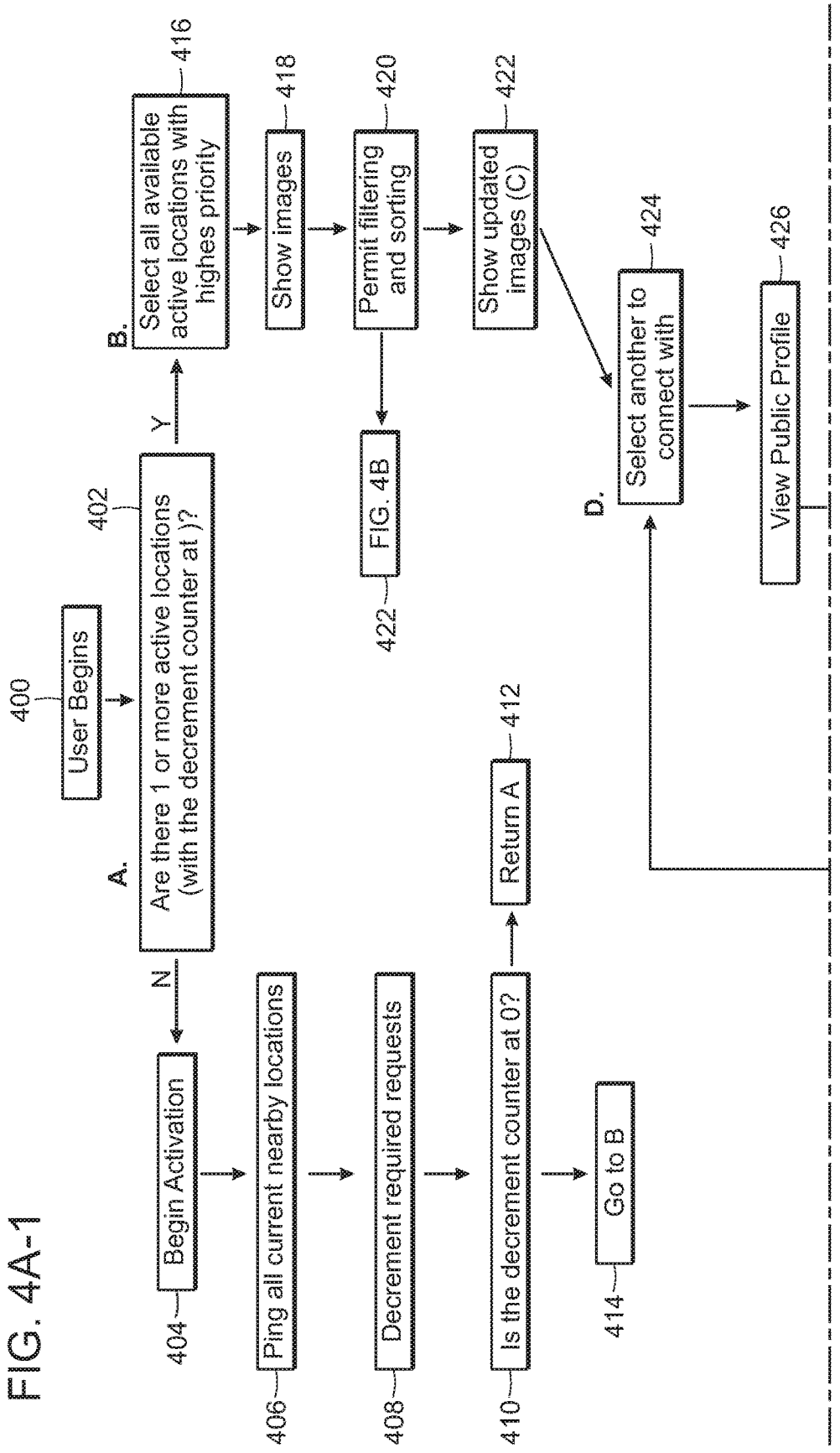
Figures 2, 4A:
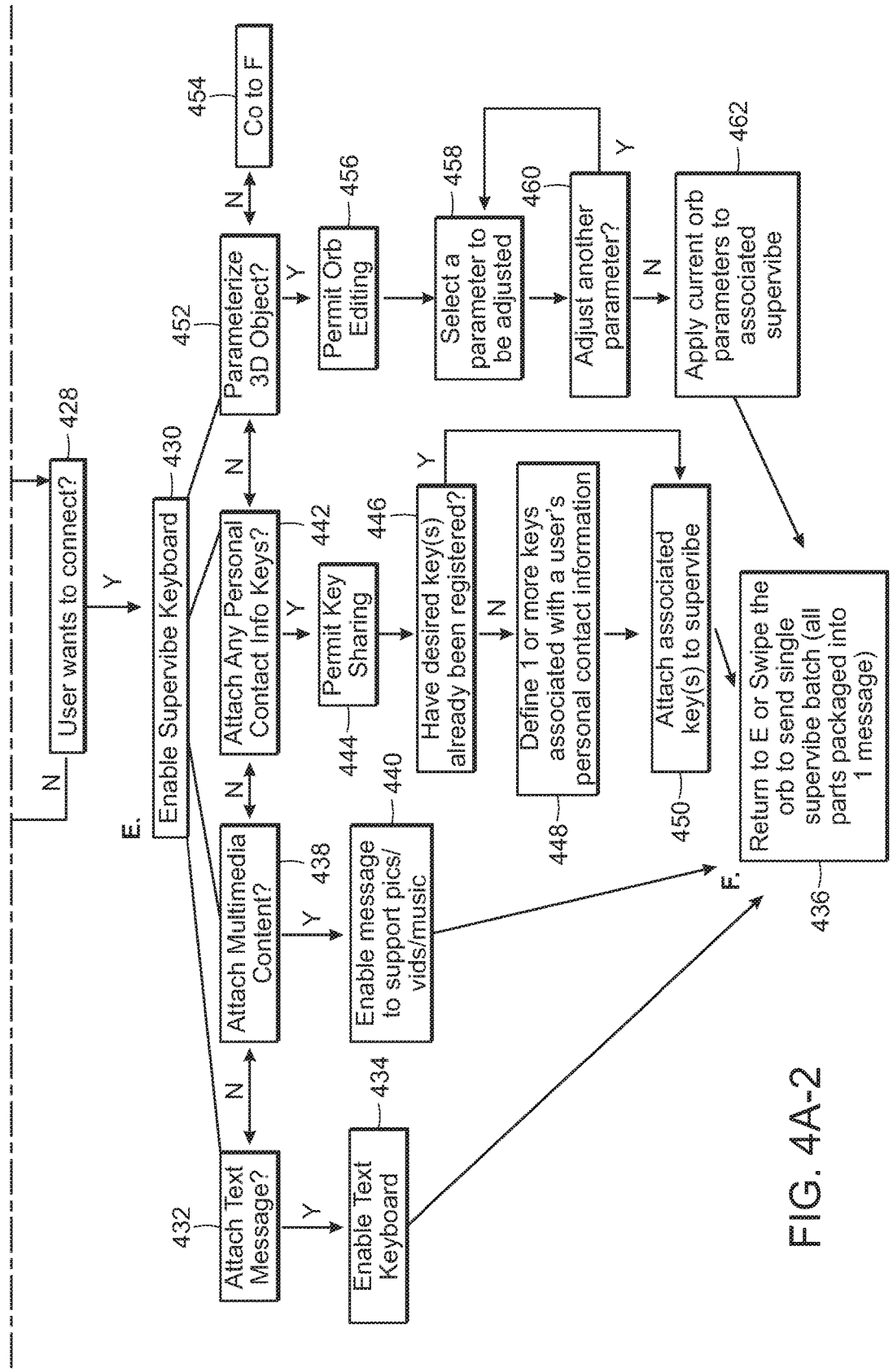
Figure 4B:
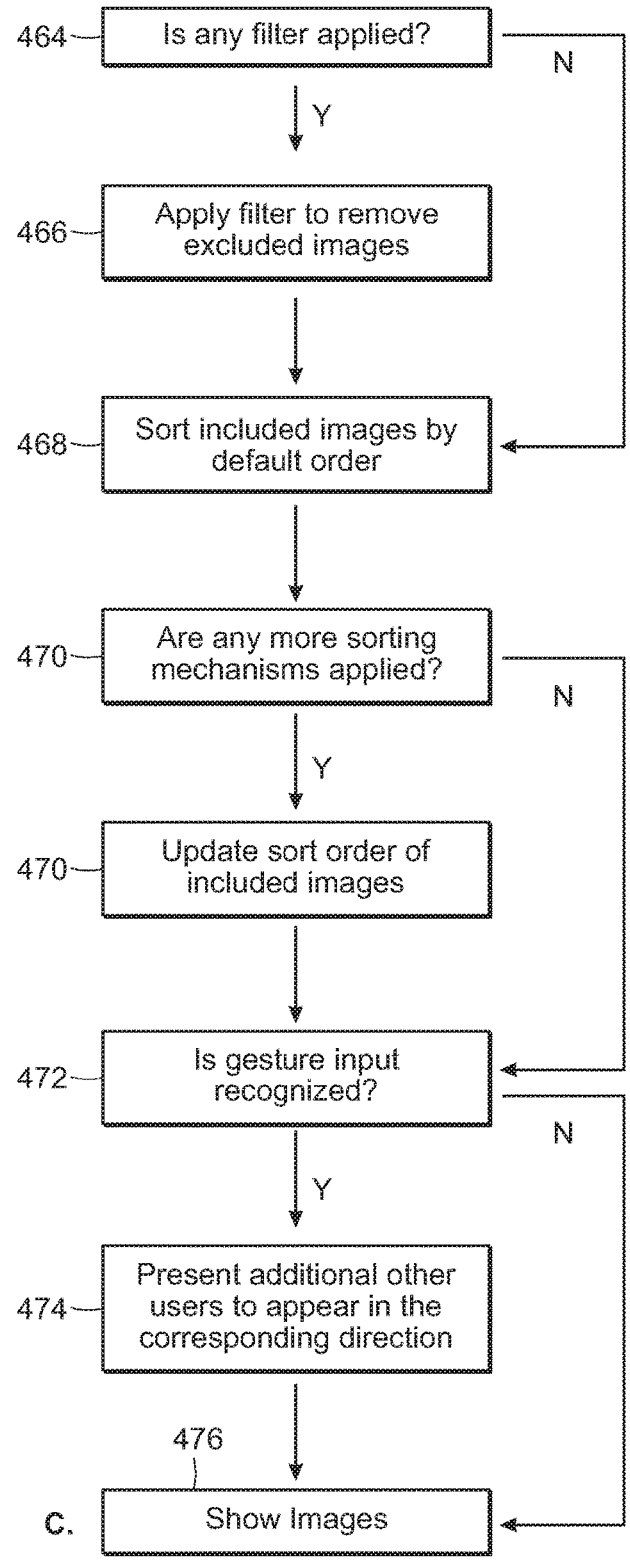

With reference to FIG. 4B, when viewing other users, if a filter is applied (step 464), the system applies the filter (step 466) to exclude certain images. The results are then sorted (step 468) by a default order (e.g., those closest to the user in that location). If any more sorting is to be applied (step 470), for example, based on movement or movement pattern data, then system then updates the sort order of included images (step 472). The system then queries whether a gesture movement is recognized as input (step 472), and if so, presents additional other users to appear in the corresponding direction of the gesture input (step 474). The system then shows the set of images (step 476).

In an embodiment, for example, the total number of Avatars displayed on the Open World Interface may be filtered through two mechanisms: (1) only show users who the user has previously conversed with over the software and (2) only show users who belong to a certain gender as entered into during registration. In this example, a user may also search for other users who are already included in the open world interface by typing their first name into the search bar. The Open World Interface will only display users with that first name who are nearby and will maintain the same sorting order as mentioned above. Further embodiments may employ, but are not limited to, additional filters such as school, teams, clubs, Greek organizations, etc.

A user may select any one of the avatars displayed in the Open World Interface by tapping on the avatar to open that User's full Public Profile. Overlaid onto the Public Profile of the Avatar who has been selected is a dynamic keyboard used by the user to message the individual identified by their Avatar and Public Profile.

All users receive a pre-constructed Public Profile which utilizes the first name and Avatar information from the registration process. The Public Profile is a visual space for users to display media that they would like the people around them to see. It can contain, but is not restricted to, identity reinforcement, skills, interests, status', mottos, social profile keys, and music. The user is prompted to customize his or her public profile, but the user can also skip this process and come back to it another time. The user may drag, resize, delete, and customize single elements of the public profile such as: the user's first name and avatar, a status, and a background photo or video. More elements will be available to add to the public profile in the future. The state of the public profile when the user clicks "done" (or decides to skip) will be saved and can be recalled from the server at anytime by the user's unique identification, which in this example, is the unique phone number.

In the current embodiment, a User's Private Profile is composed of personal (digital) contact information that remains private (a "Private Profile") until the user choses to share any or all information with a Recipient. The Private Profile consists of digital Keys, each of which is an icon representation of its corresponding social contact information or digital profile service. Supported Keys may include but are not limited to: phone number, email address, Facebook, Twitter, Instagram, LinkedIn, Soundcloud, and Snapchat. Further keys may include Keys for additional phone numbers, email addresses, or other social contact information keys or social profile Keys. Future Keys may also be added to represent digital photo/music files, money transfers, or electronic gift certificates.

With reference again to FIGS. 4A-1 and 4A-2, the system then permits a user to select another user with whom to connect (step 424), and the user may then view the other person's public profile (step 426). If the user chooses to connect with the person (step 428) the system enables a communication keyboard (step 430), and if not returns to the step D (step 424). With the communication keyboard enabled, the system permits sending text message, multimedia content, keys and three-dimensional object images all inline together as follows.

Figure 6:
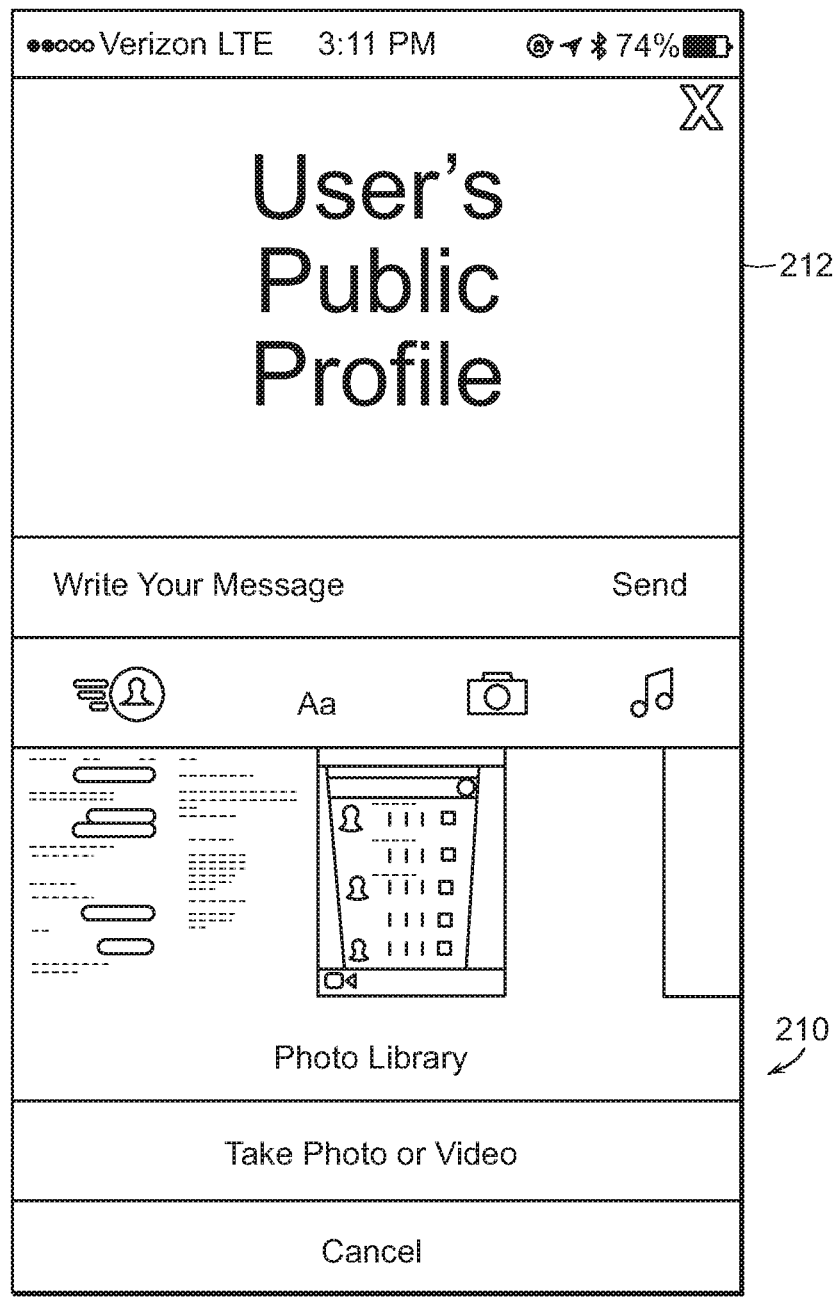
FIG. 6 shows an illustrative diagrammatic view of a mobile device for use in accordance with an embodiment of the present invention in which one or more photos are added to a message.

The keyboard system may permit a user to send a text message (step 432) by enabling the text keyboard (step 434) and then returning to step E (step 430) or swiping a three-dimensional image (orb) to send a single batch message in which all message and content is packaged (step 436). To send multimedia content (step 438), the system enables a message keyboard to support pictures/videos/music etc. (step 440) and then moves to step 436 as discussed above. For example, as shown at 210 in FIG. 6, each user may attach an image (as shown at 210) to a message being sent from a mobile device 212 in a message. To send Keys, the system enables a Key keyboard to support the sending of digital contact information.

When a user views someone's public profile by clicking his or her Avatar, the user may initiate a message to the other user by clicking anywhere on the keyboard. The icons of the keyboard include options to send a text message, send an image, or enable the sending one or more of a user's pre-populated Social Digital Contact Information keys. If the user clicks the keyboard, an editing panel corresponding to that icon will appear. In this example, if the user clicks the text box, the editing panel will fill with a keyboard and the user may type in a text message to send. If the user clicks the photo icon, the editing panel will fill with a photo picker and the user may select a photo or other image to send with or without additional edits. If the user clicks the Key icon, the editing panel opens up into the Key keyboard, which is the sender's Key Locker.

The description of the system for storing digital contact information in respective icons is as follows. Representative digital contact information icons used in the context of our application are referred to as "Keys", Each "key" can store a piece of information that uniquely identifies a user within a particular domain, e.g., Facebook, or the telephone system. Some Keys are simple text strings, e.g., a phone number (6175104496) or a twitter handle (@ma_kess), while other Keys are more complicated, requiring interaction with the domain (e.g., Facebook) to compose and/or acquire the unique identification information. These "complex keys" may include authorization from the external domain, and may be expired by the external domain. What is significant is the ability to homogenize simple and complex keys into a single consumer facing "Key Locker"—an aggregation of representative icons enabling users to input, store, and organize digital contact information. This process hides the complexity of acquiring and referencing digital contact information from various domains from the end user.

With reference again to FIGS. 4A1 and 4A-2, if a user elects to send any personal contact information in the form of such a Key or Keys (step 442), the system permits key sharing (step 444), and determines whether the desired Key or Keys have been registered (step 446), If so, the associated Key(s) are attached to the message (step 450), and if not, the system defines one or more Keys associated with a user's personal contact information (step 448), and the associated Key(s) are attached to the message (step 450). The system then moves to step 436 as discussed above.

A user looking at his/her own set of supported Keys (referred to as the Sender's Key Locker), may see Keys in either of two states: registered or unregistered, represented by its color. A user's unregistered Keys that have not yet been uploaded, entered, or integrated will be represented in grey with a green "+" sign above the key icon of that respective digital service as seen in figure. When the user clicks on a grey key or the "+" sign above the unregistered key, the user will be prompted to enter in the necessary information to link that specific Key into the user's list of integrated keys. The user's Key information is stored on the server. Registered Keys for which contact information has been provided and that have been uploaded, are colored in respectively and may be sharable to others in the system via the dynamic keyboard.

The description of the system for sending, receiving, and interacting with digital contact information is as follows. Users may securely send any number, including zero, of their registered keys to other users through the Open World Interface in a message, requiring no prior information or interaction. Users may also securely send any number, including zero, of their registered Keys to other users while in a conversation (the only requirement is that the message string must have been started via the Open World Interface).

The registered Key details are stored on the server, not sent directly to the recipient. For example, when the sender sends a Key to the receiver, what is sent is a token that only the server can interpret. Later, when the receiver goes to use the Key, the server brokers the request and decides the proper course of action. For example, the server may expire a Key or refuse to provide the true identity (if the sender has revoked the Key, for example). In this way, the Key represents a request to the server to send back a piece of information that was previously stored by the user on our server (e.g., phone number, twitter handle). At the time that that request is made, permissions, log tracking information, etc. may be enforced.

The server may determine the necessary course of action based on one of 3 states. These three states are displayed in the Recipient Key Locker and provide information to the user of how the server will react when a request is made. Active—(colored in) A recipient user sees an "active" Key if he or she has received the respective Key from a sender. The server will send back the correct piece of digital contact information to the user who accessed the Key. For example, if a user receives a colored Key and taps it, the digital contact information that was stored in the sender's Key will be returned to the recipient.

A recipient user sees an "inactive" Key if he or she has not yet received that specific from a sender. The server should not send back any information to the user who tapped the Key (because the user has not yet received the Key). Instead, the recipient user who tapped the inactive Key is prompted to send a request message to a potential sender. A recipient user sees a grey Key when the sender has either set a time limit on a Key (which has been passed) or the sender has revoked the recipient's privilege of having this Key. The server will return nothing when an expired or revoked Key is tapped.

The registered and unregistered Keys are colored identically to the private profile. A user who wishes to register an additional Key while on the public profile of a user's avatar can do so in an identical fashion as the user did to enable Keys within his or her private profile, by clicking the greyed-out Key icon or the green "+" sign and then entering in the necessary information. Once the Key is registered, it will fill in with color and will be selectable from the social contact information keyboard (sender's Key Locker).

Tapping a specific key will enter add the information corresponding to that key to the message. The user may enter any number of keys into a message, including no Keys at all. If the list of supported keys grows larger than the amount of space available on the keyboard, the user can vertically scroll in either direction to access the full list of Keys and categories of keys may, in certain embodiments, be accessed from the left side of the key keyboard.

As shown in FIGS. 8A and 8B, a user's Key keyboard may provide a plurality of active, inactive or expired keys as shown at 230 on a mobile device 232. The user may tap a key 234 to add it to a message 236 being sent from the mobile device 232.

The system is composed of two components a Sender Key Locker and a Recipient Key Locker. Each key may store a piece of information that uniquely identifies a user within a particular domain, e.g., Facebook, or the telephone system. As discussed above, Key System may store simple and complex unique identification information within them, yet hide/mask the complexity (from the end) user necessary to store such information in a representative icon that is sharable via a messaging protocol.

The Sender Key Locker displays the entire list of a user's OWN keys in two states: registered or unregistered. Registered keys that have been uploaded are colored in respectively and are sharable to others in the system from the Open World Interface. Unregistered keys have not yet been uploaded, entered, or integrated by a user are represented in grey with a green "+" sign above the key icon of that respective digital service. Unregistered keys are not sharable from the Open World Interface until they are registered. A user may register an unregistered key by tapping on the green "+" on the representative icon. The following progression takes place to register a key: a) the service authenticates with the external service if necessary, b) the server acquires the user's identity and an identifying token, c) the user's device transmits this token to the server and gets an opaque ID (a specific number associated with the user's digital identity key), and d) the key is registered on the respective user's device. Once the server obtains an opaque ID for a digital identity key, the key has been registered on the user's behalf.

Figures 11A, 11B:
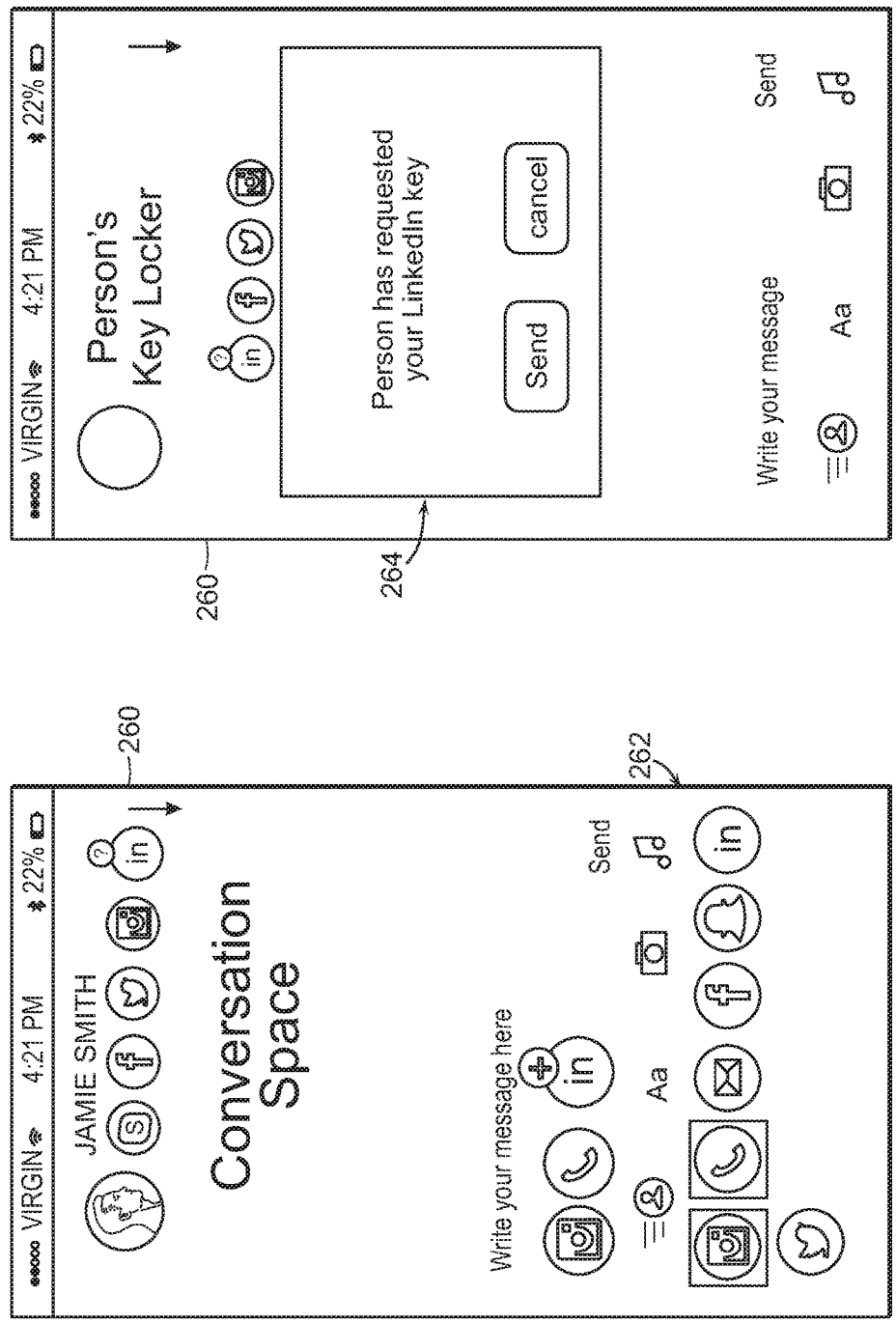
FIGS. 11A-11C show illustrative diagrammatic views of a mobile device in accordance with an embodiment of the present invention in which a Key is requested of another user, the request is accepted by the other user, and the new Key is stored in the requester's key locker.
Figure 11C:
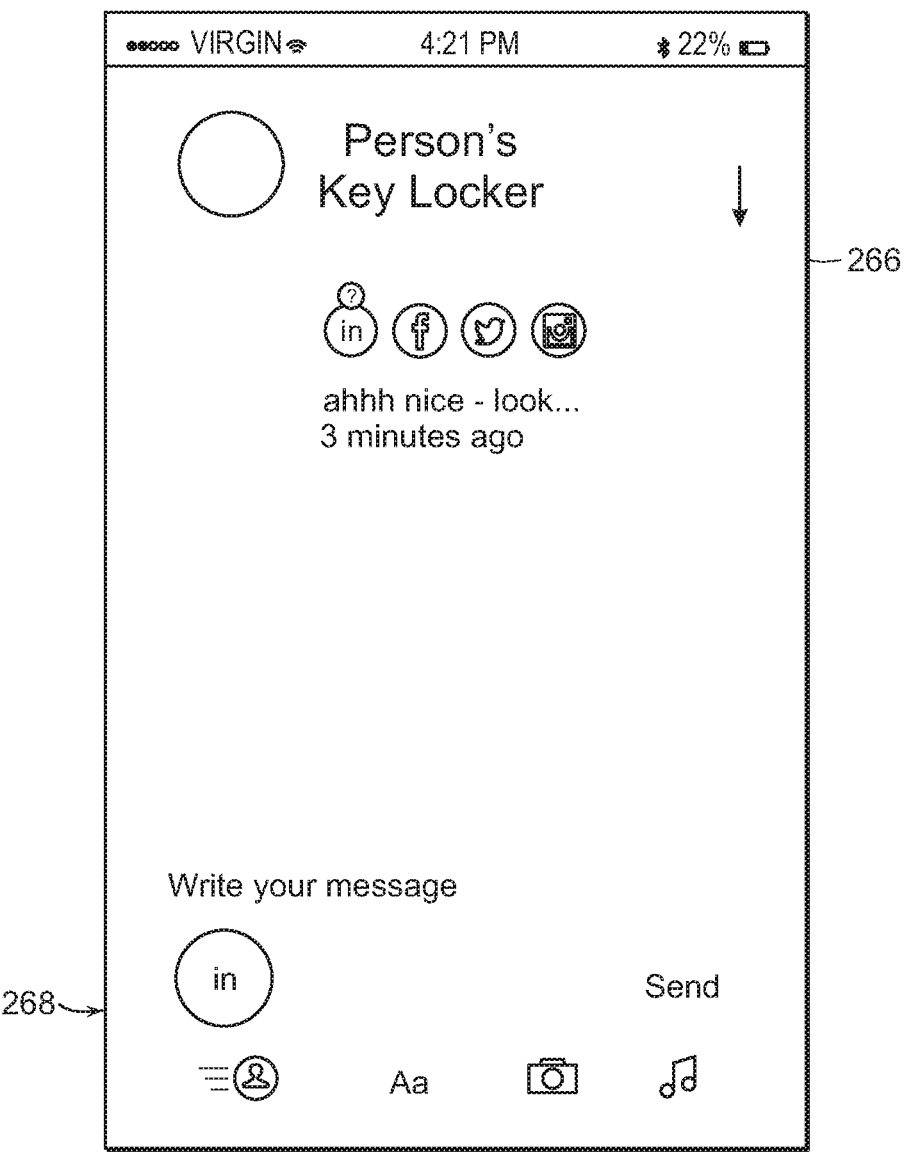

A user who taps on another user's active key will display the information stored in the key OR transport the user directly to the digital contact information site, page, app . . . etc (for example, tapping on a user's active Facebook key takes me directly to his Facebook profile). FIG. 11A, for example, shows a mobile device 260 with at least one inactive key 262. As shown in FIG. 11B, when a user requests this key, a message is prepared and sent (as shown at 264) to the other user. As shown in FIG. 11C, the other user of their own mobile device 266 may then accept the request and automatically place the key requested in the message box as shown at 268.

The Recipient Key Locker is used to display the states of all the supported keys on the service to a single user. It is likely that one user will have many different key states in one key locker (for example, having some active, some inactive, and some expired or revoked keys in a single key locker. The Key Locker may be expanded by tapping the arrow on the bottom right side. Tap the arrow again to minimize the key locker.

It is also possible to request a Key from a user. This is done by tapping on any of that user's grey Keys with question mark badges. The recipient of a grey key with a question mark badge can either accept or decline the request to send a specific key. Accepting the request fills the specific key in the message box (as would a normal Key) and the requested Key can be sent. Declining the request simply does not put the requested Key in the message box. It is also possible to have expired or revoked Keys, indicated in a grey color without a question mark badge above it. A recipient user sees a grey Key when the sender has either set a time limit on a Key (which has been passed) or the sender has revoked the recipient's privilege of having this key. The server will return nothing when an expired or revoked key is tapped).

Figure 9B:
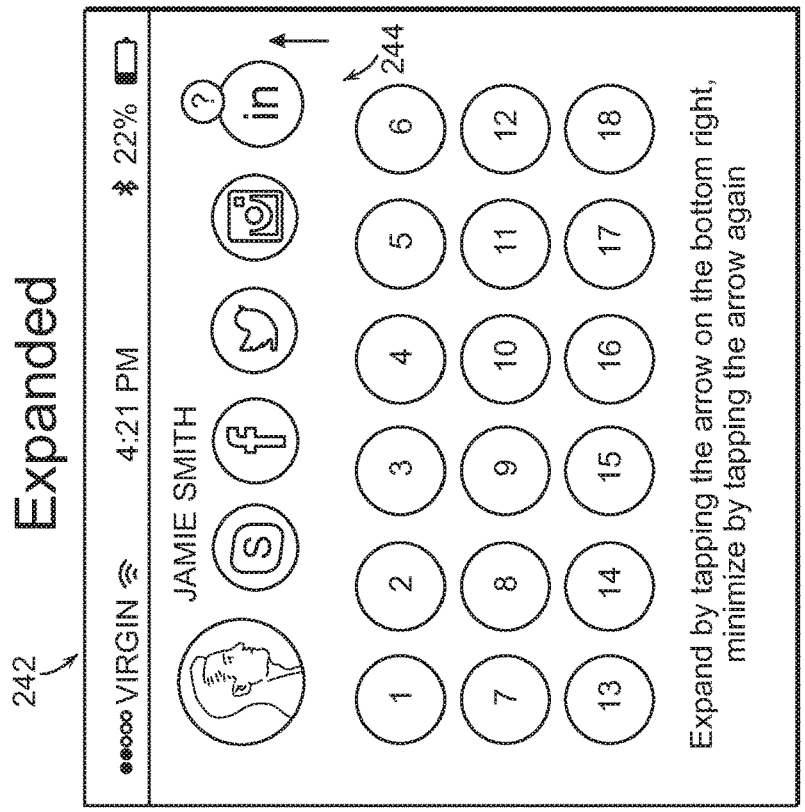
FIGS. 9A and 9B show illustrative diagrammatic views of recipient Key lockers, minimized and expanded respectively, in accordance with an embodiment of the present invention.
Figure 9A:
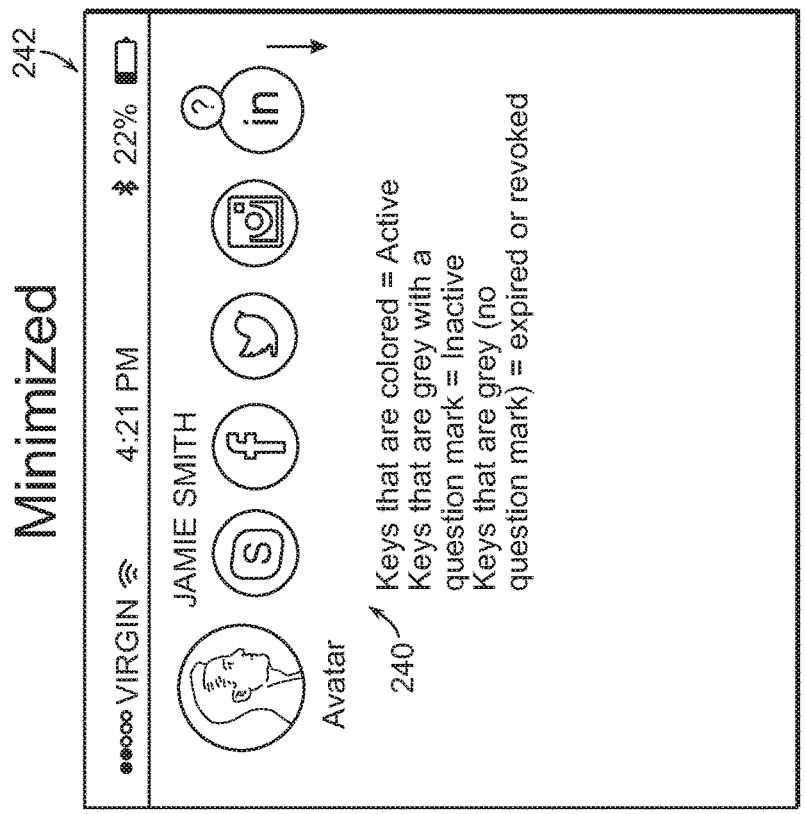

As shown in FIGS. 9A and 9B, a user's Key Locker 240 on a mobile device 242 may provide a minimized view 244 or an expanded view 246 by tapping on an arrow symbol.

Below the Key Locker on the Conversation View is a back and forth list of the user's message conversation. Messages are not determined by having keys in them or not, a message can contain any media that is "sent" by a user to another user.

With reference again to FIGS. 4A-1 and 4A-2, a user may elect to parameterize and send an orb (step 452) to another user, and if so, the system will then permit orb editing (step 456) and the user may select a parameter for adjusting (step 548). If not, the system returns (step 454) to step E (step 430). Each Supervibe sent, for example, may include an orb and any digital contact information, such as messages, Keys and multimedia. A user may elect to adjust several parameters (step 460) of the orb, and the system then applies the current orb parameters to an associated message (Supervibe) to be sent (step 462). The system then sends the Supervibe as a single batch message in which all message, content and the orb parameters are packaged inline, displaying all inputted content together (step 436).

A method is therefore also provided for parameterizing and sharing 3-Dimensional dynamic-emoticons. The dynamic emoticon may be any 3D emoticon that contains animation. An emoticon may be any glyph/symbol/or object that can project/display an emotional state. The dynamic-emoticons require a renderer capable of drawing the 3D object and a composer capable of adjusting parameters to manipulate the 3D object in real time. The renderer represents the customizable parameters used to manipulate the properties of the dynamic-emoticon. There are two categories of parameters used to manipulate the dynamic-emoticon: system facing parameters and user facing parameters. The system facing parameters may be adjusted to represent a theoretically infinite number of dynamic-emoticons. The renderer represents the current settings of the system facing parameters.

Where the user facing parameters simplify the system facing parameters by combining multiple parameters into one control; a switch, nob, color wheel, etc. to make the parameterization process simpler/easier for the user to use.

Where the user facing parameters can also be extracted/inputted from external or environmental sources such as (but not limited to): accelerometer of the electronic device, heart rate, music, eye color, sweat, current mood, and emotion. When the user sends a dynamic-emoticon, its system facing parameters are sent to the server, and returned on the recipient's device. Upon receiving the dynamic-emoticon, the recipient user's dynamic-emoticon renderer will apply identical system facing parameter data to replicate the dynamic-emoticon that was sent. The dynamic-emoticons are used as a reflection of the current emotional state of the sender.

Figure 14:
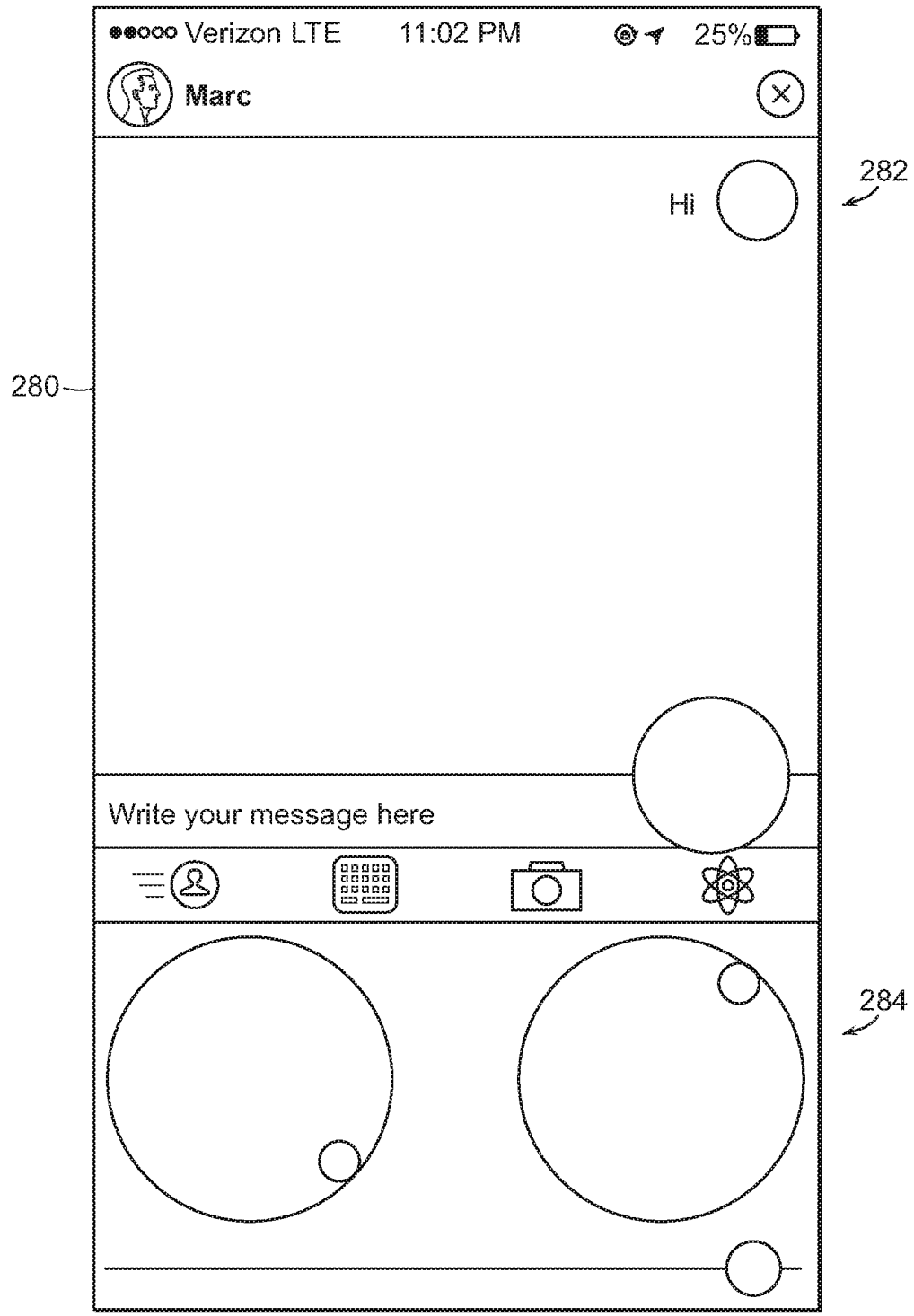
FIG. 14 shows an illustrative diagrammatic view of a mobile device in accordance with an embodiment of the present invention in which a three dimensional dynamic emoticon is being prepared.
Figure 15:
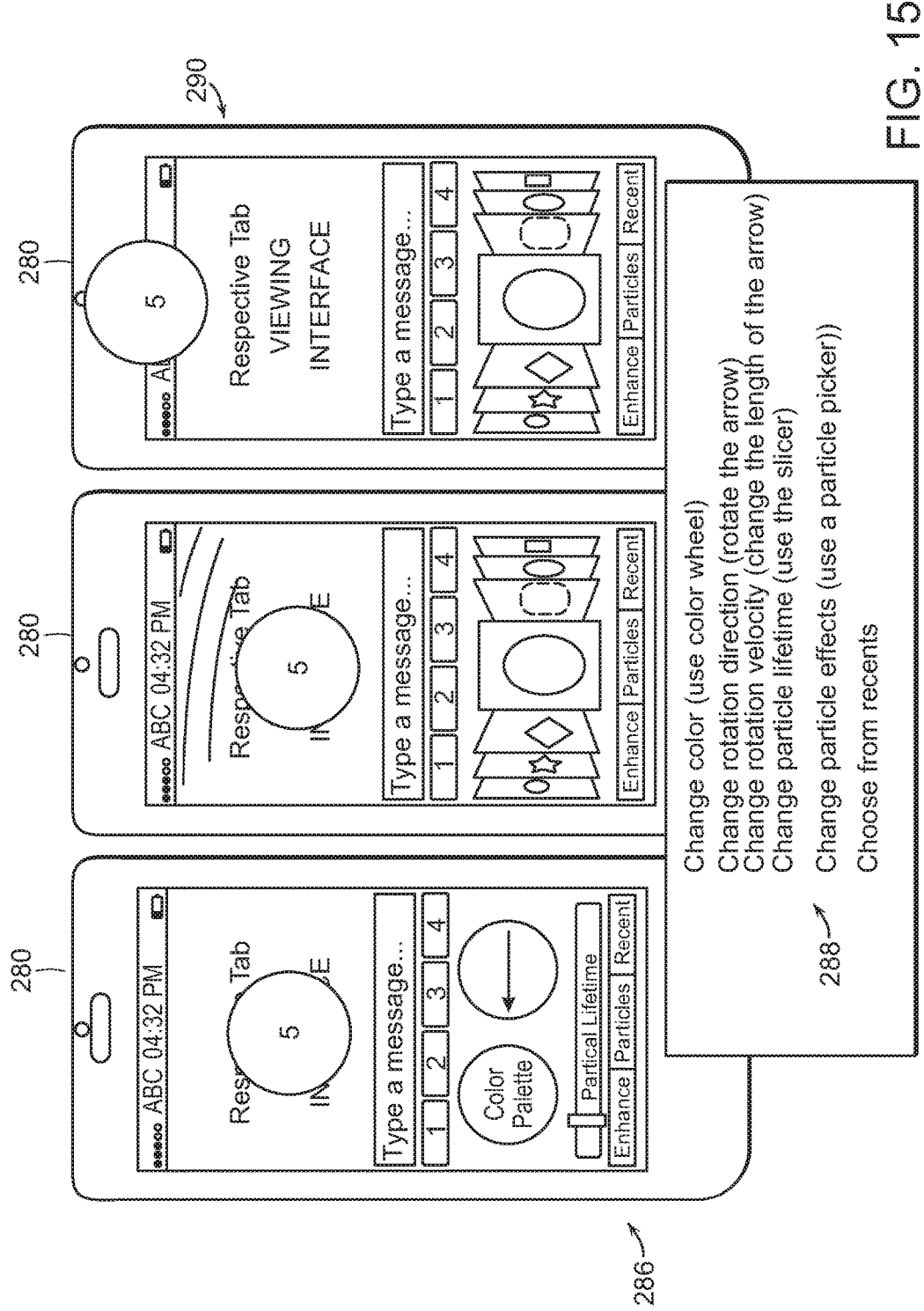
FIG. 15 shows an illustrative diagrammatic view of a mobile device in accordance with an embodiment of the present invention in which further options are available for modifying a three dimensional dynamic emoticon.

FIG. 14, for example, shows a mobile device 280 that shows a message that a user is preparing (shown at 282) based on input parameters (e.g., direction and/or speed of orb spinning) of the user's choice (shown at 284). As shown in FIG. 15, additional input parameters may also be available as shown at 286 (color palette), and 288 (orb particle lifetime and effects). As also shown in FIG. 15, the orb may be sent from the device 28—as shown at 290.

Figure 16B:
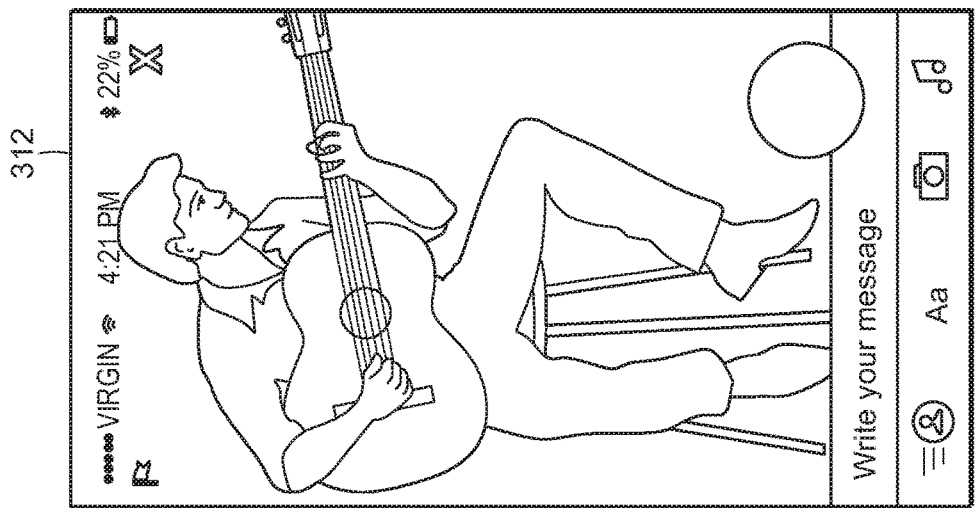
FIGS. 16A and 16B show illustrative diagrammatic views of a mobile device in accordance with an embodiment of the present invention in which a three dimensional dynamic emoticon is being sent to another user and a mobile device in accordance with an embodiment of the present invention in which the three dimensional dynamic emoticon is received by the other user.
Figure 16A:
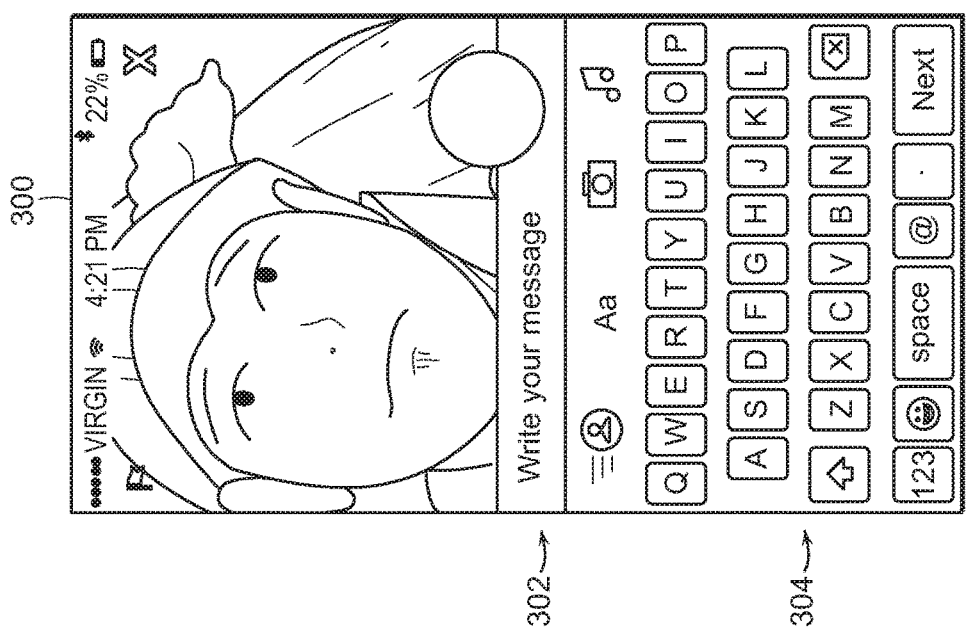

With reference to FIG. 16, the designed orb parameters may be sent from a first user's device 300 with a message (302) as prepared as shown at 304, and then sent to another user of a mobile device 312 with the message and orb 310.

A user may then send the message as follows. Users may securely send their Keys to other users from the Open World Interface in a message, requiring no prior information or interaction. The Key details are stored on our server, not sent directly to the recipient. For example, when the sender sends a Key to the receiver, what gets sent is a token that only our server can interpret. Later, when the receiver goes to use the Key, the server brokers the request and decides what proper course of action should be taken. For example, the server may expire or refuse to provide the true identity (if the sender has revoked the Key, for example). In this way, the Key represents a request to the server to send back a piece of information that was previously stored by the user on the server (e.g., phone number, twitter handle). At the time that that request is made, permissions may be enforced, as well as log tracking information, etc.

The message that is being sent is a JSON package of all media types (1 message can contain Keys, and any other type of media, including a 3D dynamic emoticon) so that a message with several different pieces of content is received as one message. In other words, one may send content other than just Keys in a message on the service.

Once a user has selected all desired Keys and any text/photo content, her or she may transmit the message. If a user decides not to message an Avatar, he or she may exit out of that Avatar's public profile by clicking on the X at the top corner of the public profile, which will return the user to the Open World Interface.

Figures 1, 4C:
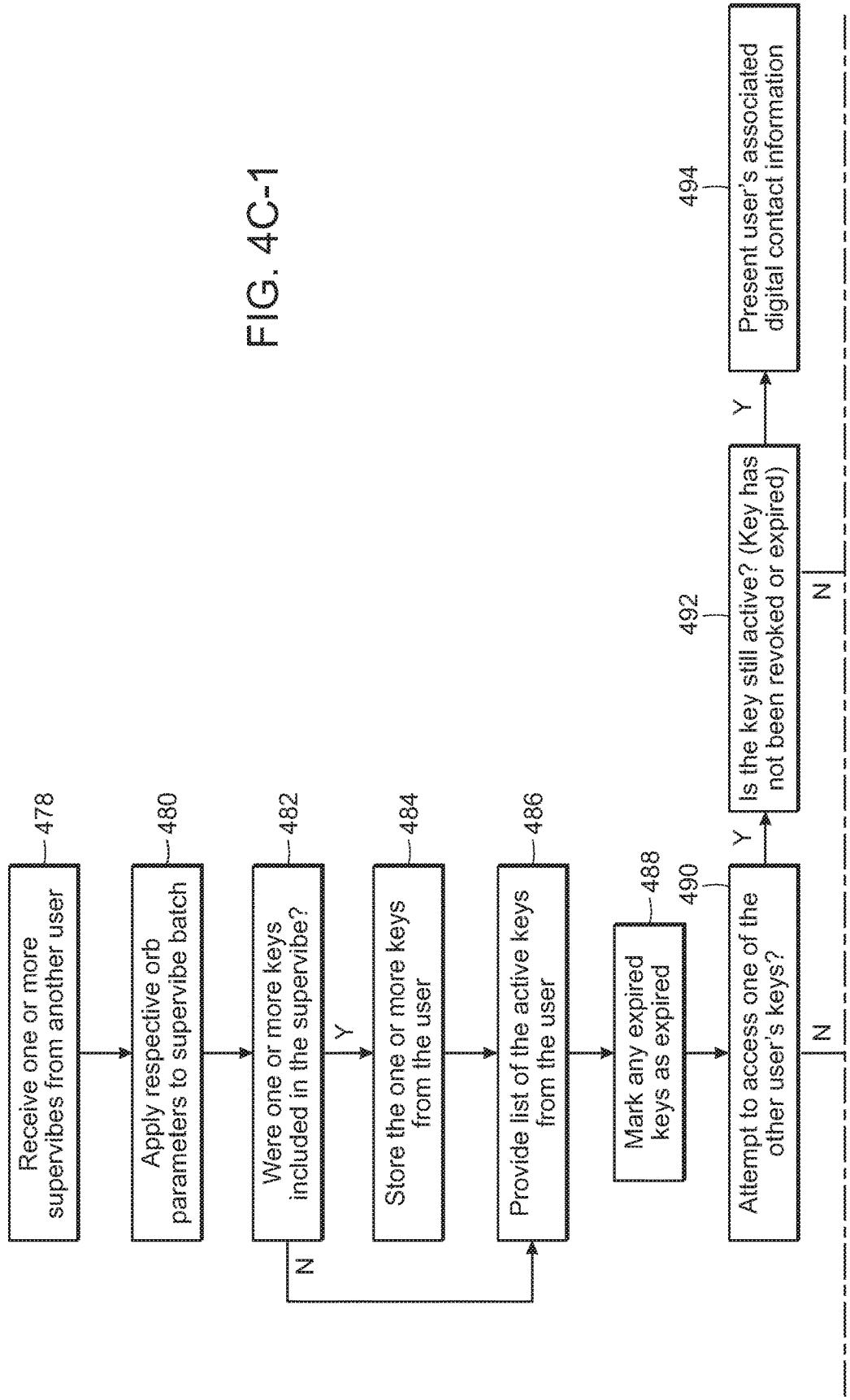
Figures 2, 4C:
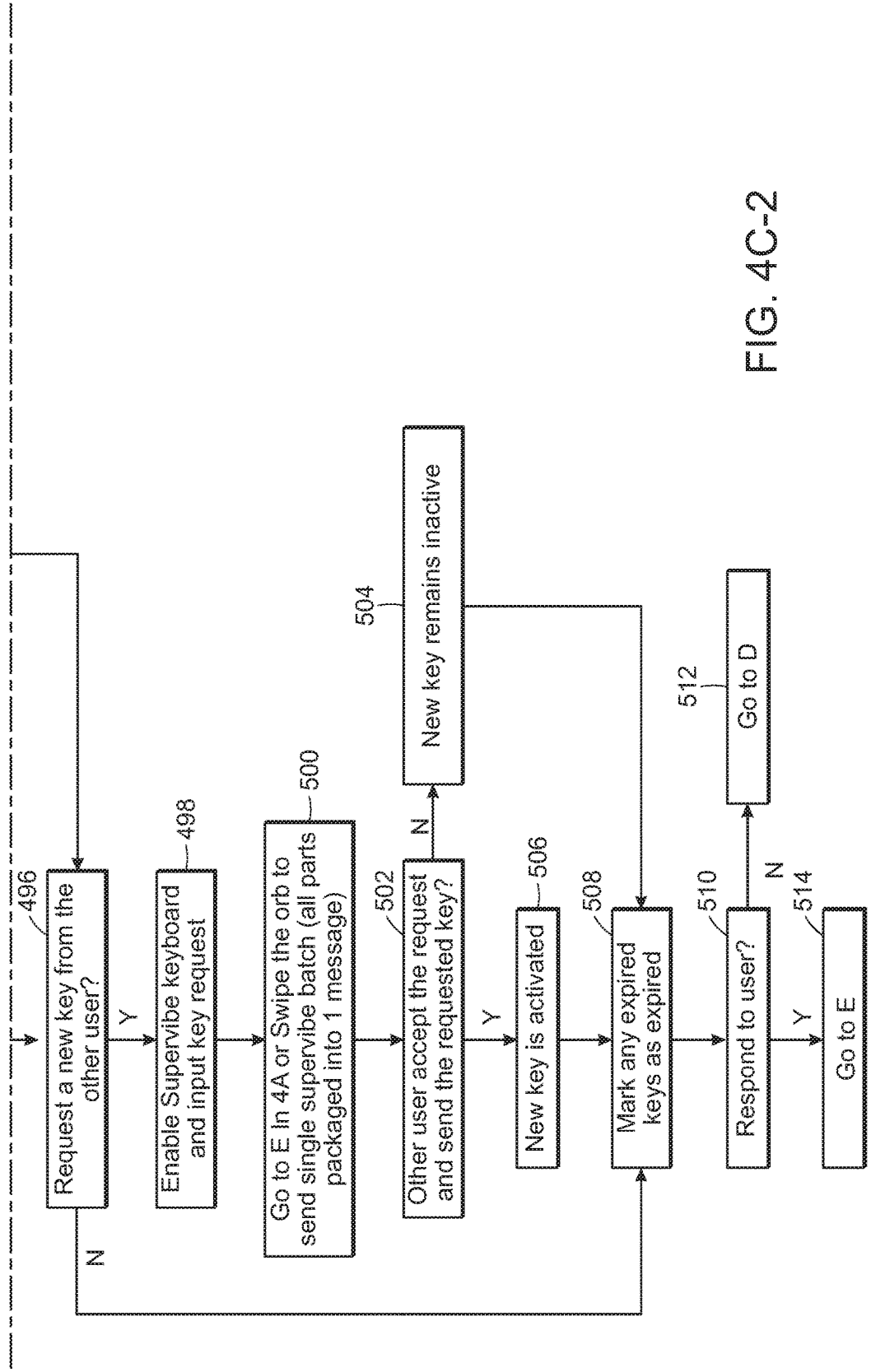

For example, and with reference to FIGS. 4C-1 and 4C-2, the system may permit a user to receive one or more Supervibes from another user (step 478). The system then applies respective orb parameters to the Supervibe batch (step 480), and then determines whether one or more Keys are included in the Supervibe (step 482). If so, the one or more Keys are stored for the user (step 484). The system then provides a list of the active Keys from the user (step 486), and marks as expired any expired Keys (step 488). The system may then permit the user to attempt to access one of the other user's Keys (step 490). If such an attempt is made, the system determines if the Key is still active (not revoked or expired) (step 492), and then presents the user's associated digital contact information (step 494).

If no such access attempt is made or is not permitted, the system may request a new Key from the other user (step 496). If so, the system will enable a Supervibe keyboard and input Key request (step 498) and then the system may go to step E in FIGS. 4A-1 and 4A-2 or permit the user to swipe the orb to send a single Supervibe batch (all packaged into one message (step 500). The system will then permit the other user to accept the request and send the requested Key (step 502). If not accepted, the new Key will remain inactive (step 504) and may later become expired. If accepted, the new Key becomes activated (step 506) until and unless it becomes expired (step 508). If the user does not receive a response (step 510), then the system moves (step 512) to step D in FIGS. 4A-1 and 4A-2, and if the user does receive a response, then the system moves (step 514) to step E in FIGS. 4A-1 and 4A-2.

In addition to the inbox view, all sent and received messages will be viewable by a recipient within the "conversation view." A user may similarly access the conversation view to see all sent and received messages with recipients. The conversation view has a section header at the top (referred to as the Recipient Key Locker) that includes the avatar of the other user in the conversation and the Recipient's Key Locker (list of that user's Keys, both the Keys received and the Keys not yet received differentiated by aforementioned color states and badges).

Any message within the conversation view that contains Keys will display the Keys at the top of the message box. Clicking on any of the keys within an individual message has the same effect as clicking on a Key from the inbox or the Key locker described above. The user will be taken directly to the sender's digital profile on the medium that the specific Key represents.

The dynamic keyboard on the Public Profile is also overlaid on the Conversation View to allow users the opportunity to send a response message from the conversation view itself, allowing the user to send a message without going to the Public Profile of the user. The dynamic keyboard operates the same as described above where clicking on the "Key icon within the keyboard will open up the Key keyboard allowing the user to send keys back to the opposite user in the conversation.

As shown in FIG. 12A, a user of a mobile device 270 may view their Private Profile and may edit their Public Profile (as shown at 272) to include any of a plurality of their own social profiles stored as their Key Locker (as shown at 274). FIG. 12B shows the user viewing their inbox of messages (shown at 276), each message including an identification image (photo), the Avatar (e.g., first) name and all content that was send as a package from another user.

Those skilled in the art will appreciate that numerous modifications and variation may be made to the above disclosed embodiments without departing from the spirit and scope of the present invention.

What is claimed is:

1. A method for permitting a user of a mobile device system to connect with other users of the mobile device system, said method comprising the steps of:
activating a pre-defined geographical location such that users of the mobile device system (including the user and the other users) are within the pre-defined geographical location;
presenting to the other users on a mobile device, a plurality of images within the pre-defined geographical location;

permitting each of the other users to select from the plurality of images, a location related image associated with the predefined geographic location;

registering a user related image associated with the user;

defining a Key that includes a link to unique digital contact information of the user;

sending the Key to the other user, wherein the key has a familiar appearance that displays information regarding a type of service, but does not disclose any of the link information regarding the user's unique digital contact information;

permitting the user of a mobile device in the mobile device environment to adjust at least two parameters of a three-dimensional moving image, said moving image being defined by three-dimensional spatial data, as well as rotational direction and velocity data; and sending information regarding the three-dimensional moving image to another person's mobile device in the mobile device environment such that an identical three-dimensional moving image may be created on the other person's mobile device to communicate any of an emotional expression and communication information, wherein said information regarding the three-dimensional moving image is transmitted by throwing the moving image on the mobile device with a portion of the user's body.

2. The method as claimed in claim 1, wherein users within a pre-defined distance from any pre-defined geographical locations are considered to be within the respective pre-defined geographical location.

3. The method as claimed in claim 1, wherein said method further includes the step of permitting the user apply a filter to display on the mobile device, a set of available pre-defined geographical locations that satisfy the filter.

4. The method as claimed in claim 3, wherein said filter is responsive to at least one sensor on the user's mobile device.

5. The method as claimed in claim 4, wherein said at least one sensor includes any of an accelerometer, a position detection system, a direction detection system and a velocity detection system.

6. The method as claimed in claim 1, wherein said method further includes the step of sorting the plurality of images.

7. The method as claimed in claim 6, wherein said step of sorting is responsive to any of a time that other users checked-in to the pre-defined geographical location, a specific location of each of the other users within the pre-defined geographical location, and information regarding acceleration, position detection or direction detection of each of the other users.

8. The method as claimed in claim 1, wherein said method further includes the step of permitting the user to view additional images associated with the other users of the mobile device system in all x, y directions from a current viewing screen.

9. The method as claimed in claim 1, wherein said method further includes the step of determining whether a user has moved out of a pre-defined geographical location.

10. The method as claimed in claim 1, wherein said method further includes the steps of:

receiving one or more Keys from another user of the mobile device system;

storing the one or more Keys on a mobile device of the user; and making one or more Keys available to the user of the mobile device.

11. The method as claimed in claim 1, wherein said three-dimensional moving image is a moving image of a generally spherical-shaped object.

12. The method as claimed in claim 11, wherein said at least two parameters include any of a speed at which the sphere is spinning, a direction in which the sphere is spinning, and at least one color of the sphere.

13. The method as claimed in claim 1, wherein said finger touches a screen of the mobile device.

14. The method as claimed in claim 1, wherein said information regarding the three-dimensional moving image is transmitted by using a gesture, and is responsive to accelerometer data from the user's mobile device.

15. A method for permitting a user of a mobile device system to connect with other users of the mobile device system, said method comprising the steps of:

activating a pre-defined geographical location such that users of the mobile device system (including the user and the other users) are within the pre-defined geographical location;

presenting to the other users on a mobile device, a plurality of images within the pre-defined geographical location;

permitting each of the other users to select from the plurality of images, a location related image associated with the predefined geographic location;

registering a user related image associated with the user;

defining a Key that includes a link to unique digital contact information of the user;

sending the Key to the other user, wherein the key has a familiar appearance that displays information regarding a type of service, but does not disclose any of the link information regarding the user's unique digital contact information;

permitting the user of a mobile device in the mobile device environment to adjust at least two parameters of a three-dimensional moving image, said moving image being defined by three-dimensional spatial data, as well as rotational direction and velocity data; and sending information regarding the three-dimensional moving image to another person's mobile device in the mobile device environment such that an identical three-dimensional moving image may be created on the other person's mobile device to communicate any of an emotional expression and communication information, wherein said information regarding the three-dimensional moving image is transmitted by using a gesture, and is responsive to accelerometer data from the user's mobile device.

16. The method as claimed in claim 15, wherein users within a pre-defined distance from any pre-defined geographical locations are considered to be within the respective pre-defined geographical location.

17. The method as claimed in claim 15, wherein said method further includes the step of permitting the user apply a filter to display on the mobile device, a set of available pre-defined geographical locations that satisfy the filter.

18. The method as claimed in claim 17, wherein said filter is responsive to at least one sensor on the user's mobile device.

19. The method as claimed in claim 18, wherein said at least one sensor includes any of an accelerometer, a position detection system, a direction detection system and a velocity detection system.

20. The method as claimed in claim 15, wherein said method further includes the step of sorting the plurality of images.

21. The method as claimed in claim 20, wherein said step of sorting is responsive to any of a time that other users checked-in to the pre-defined geographical location, a specific location of each of the other users within the pre-defined geographical location, and information regarding acceleration, position detection or direction detection of each of the other users.

22. The method as claimed in claim 15, wherein said method further includes the step of permitting the user to view additional images associated with the other users of the mobile device system in all x, y directions from a current viewing screen.

23. The method as claimed in claim 15, wherein said method further includes the step of determining whether a user has moved out of a pre-defined geographical location.

24. The method as claimed in claim 15, wherein said method further includes the steps of:
receiving one or more Keys from another user of the mobile device system;
storing the one or more Keys on a mobile device of the user; and
making one or more Keys available to the user of the mobile device.

25. The method as claimed in claim 15, wherein said three-dimensional moving image is a moving image of a generally spherical-shaped object.

26. The method as claimed in claim 25, wherein said at least two parameters include any of a speed at which the sphere is spinning, a direction in which the sphere is spinning, and at least one color of the sphere.

27. The method as claimed in claim 15, wherein said information regarding the three-dimensional moving image is transmitted by throwing the moving image on the mobile device with a finger.

28. The method as claimed in claim 27, wherein said finger touches a screen of the mobile device.

* * * * *